United States Patent
Zhang et al.

(10) Patent No.: US 12,504,887 B2
(45) Date of Patent: Dec. 23, 2025

(54) ERASE AND PROGRAM OPERATIONS FOR MEMORY DEVICES HAVING MULTIPLE STORAGE MODES

(71) Applicant: Yangtze Memory Technologies Co., Ltd., Hubei (CN)

(72) Inventors: Yi Zhang, Wuhan (CN); Lei Guan, Wuhan (CN); Hongtao Liu, Wuhan (CN); Xiaojiang Guo, Wuhan (CN); Chenhui Li, Wuhan (CN); Jialiang Deng, Wuhan (CN); Zhenjia Chen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 207 days.

(21) Appl. No.: 18/451,769

(22) Filed: Aug. 17, 2023

(65) Prior Publication Data

US 2025/0028453 A1   Jan. 23, 2025

(30) Foreign Application Priority Data

Jul. 18, 2023   (CN) .......................... 202310886607.3

(51) Int. Cl.
*G11C 11/56* (2006.01)
*G06F 3/06* (2006.01)

(52) U.S. Cl.
CPC .......... *G06F 3/0619* (2013.01); *G06F 3/0634* (2013.01); *G06F 3/0659* (2013.01); *G06F 3/0679* (2013.01)

(58) Field of Classification Search
CPC .... G06F 3/0619; G06F 3/0634; G06F 3/0659; G06F 3/0679
See application file for complete search history.

(56) References Cited

U.S. PATENT DOCUMENTS

| | | | | |
|---|---|---|---|---|
| 11,335,411 | B1* | 5/2022 | Lien | G11C 16/14 |
| 2011/0208896 | A1* | 8/2011 | Wakrat | G11C 11/5642 |
| | | | | 711/E12.001 |
| 2020/0064897 | A1* | 2/2020 | Nomura | G11C 5/144 |
| 2023/0317185 | A1* | 10/2023 | Bhat | G06F 3/0616 |

* cited by examiner

*Primary Examiner* — Min Huang
(74) *Attorney, Agent, or Firm* — Fish & Richardson P.C.

(57) ABSTRACT

Methods, systems, and apparatus, including computer programs encoded on computer storage media, for operating a memory device having multiple storage modes. In one example method, a portion of a memory array is selected, wherein the portion of the memory array is programmable in a first storage mode or a second storage mode. The second storage mode has a lower storage density than the first storage mode, and the first storage mode corresponds to a first erase operation. A switch erase operation is performed to switch the portion of the memory array from the first storage mode to a switched second storage mode, wherein the switched second storage mode has the same storage density as the second storage mode and corresponds to the switch erase operation. The switch erase operation is different from the first erase operation on the memory array in the first storage mode.

20 Claims, 22 Drawing Sheets

QLC BLOCK SWITCH SLC BLOCK SEQUENCE WITH SWITCH PROGRAM

ERASE AND PROGRAM OPERATIONS FOR MEMORY DEVICES HAVING MULTIPLE STORAGE MODES

CROSS-REFERENCE TO RELATED APPLICATIONS

This application claims priority to Chinese Patent Application No. 202310886607.3, filed on Jul. 18, 2023, which is hereby incorporated by reference in its entirety.

TECHNICAL FIELD

The present disclosure generally relates to a memory system, and more specifically, relates to operating a memory device having multiple storage modes.

BACKGROUND

A memory system can include one or more memory components that store data. The memory components can be, for example, non-volatile memory components and volatile memory components. In general, a host system can utilize a memory system to store data at the memory components and to retrieve data from the memory components.

SUMMARY

The present disclosure describes operating a memory device having multiple storage modes.

In one aspect, for example, the present disclosure describes a method for operating a memory device. The method includes selecting a portion of a memory array, and performing a switch erase operation to switch the portion of the memory array from the first storage mode to a switched second storage mode. The portion of the memory array is programmable in a first storage mode or a second storage mode. The second storage mode has a lower storage density than the first storage mode, and the first storage mode corresponds to a first erase operation. The switched second storage mode has the same storage density as the second storage mode and corresponds to the switch erase operation. The switch erase operation is different from the first erase operation on the memory array in the first storage mode.

In another aspect, the present disclosure describes a memory device. The memory device includes: a memory array; and a peripheral circuit coupled to the memory array and configured to perform operations comprising: selecting a portion of a memory array, wherein the portion of the memory array is programmable in a first storage mode or a second storage mode, and performing a switch erase operation to switch the portion of the memory array from the first storage mode to a switched second storage mode. The second storage mode has a lower storage density than the first storage mode, and the first storage mode corresponds to a first erase operation using a first effective erase voltage. The switched second storage mode has the same storage density as the second storage mode and corresponds to the switch erase operation, and after performing the switch erase operation, a threshold voltage of a memory cell of the portion of the memory array is higher than a threshold voltage of the memory cell of the portion of the memory array after performing the first erase operation.

In another aspect, the present disclosure describes one or more non-transitory computer-readable storage media. The one or more non-transitory computer-readable storage media store instructions that when executed by one or more machines cause the one or more machines to perform operations comprising: selecting a portion of a memory array, and performing a switch erase operation to switch the portion of the memory array from the first storage mode to a switched second storage mode. The portion of the memory array is programmable in a first storage mode or a second storage mode, wherein: the second storage mode has a lower storage density than the first storage mode, and the first storage mode corresponds to a first erase operation. The switched second storage mode has the same storage density as the second storage mode and corresponds to the switch erase operation, and after performing the switch erase operation, a threshold voltage of a memory cell of the portion of the memory array is higher than a threshold voltage of the memory cell of the portion of the memory array after performing the first erase operation.

In another aspect, the present disclosure describes another method for operating a memory device. The method includes selecting a portion of a memory array, and performing a switch program operation to switch the portion of the memory array in the first storage mode to a switched second storage mode. The portion of the memory array is programmable in a first storage mode or a second storage mode. The second storage mode has a lower storage density than the first storage mode, and the second storage mode corresponds to a second program operation. The switched second storage mode has the same storage density as the second storage mode and corresponds to the switch program operation. The switch program operation is different from the second program operation of the second storage mode.

In another aspect, the present disclosure describes a memory device. The memory device includes: a memory array; and a peripheral circuit coupled to the memory array and configured to perform operations comprising: selecting a portion of a memory array, and performing a switch program operation to switch the portion of the memory array in the first storage mode to a switched second storage mode. The portion of the memory array is programmable in a first storage mode or a second storage mode. The second storage mode has a lower storage density than the first storage mode, the first storage mode corresponds to a first program operation, and the second storage mode corresponds to a second program operation. The switched second storage mode has the same storage density as the second storage mode and corresponds to the switch program operation. The switch program operation is different from the second program operation of the second storage mode.

In another aspect, the present disclosure describes one or more non-transitory computer-readable storage media. The one or more non-transitory computer-readable storage media store instructions that when executed by one or more machines cause the one or more machines to perform operations comprising: selecting a portion of a memory array, and performing a switch program operation to switch the portion of the memory array in the first storage mode to a switched second storage mode. The portion of the memory array is programmable in a first storage mode or a second storage mode. The second storage mode has a lower storage density than the first storage mode, the first storage mode corresponds to a first program operation, and the second storage mode corresponds to a second program operation. The switched second storage mode has the same storage density as the second storage mode and corresponds to the switch program operation. The switch program operation is different from the second program operation of the second storage mode In still another aspect, the present disclosure describes a memory system. The memory system includes a controller; a memory device comprising a memory array; and a peripheral circuit coupled to the memory array and configured to perform operations comprising: selecting a portion of a memory array, and performing a switch program operation to switch the portion of the memory array in the first storage mode to a switched second storage mode. The portion of the memory array is programmable in a first storage mode or a second storage mode. The second storage mode has a lower storage density than the first storage mode, the first storage mode corresponds to a first program operation, and the second storage mode corresponds to a second program operation. The switched second storage mode has the same storage density as the second storage mode and corresponds to the switch program operation. The switch program operation is different from the second program operation of the second storage mode.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
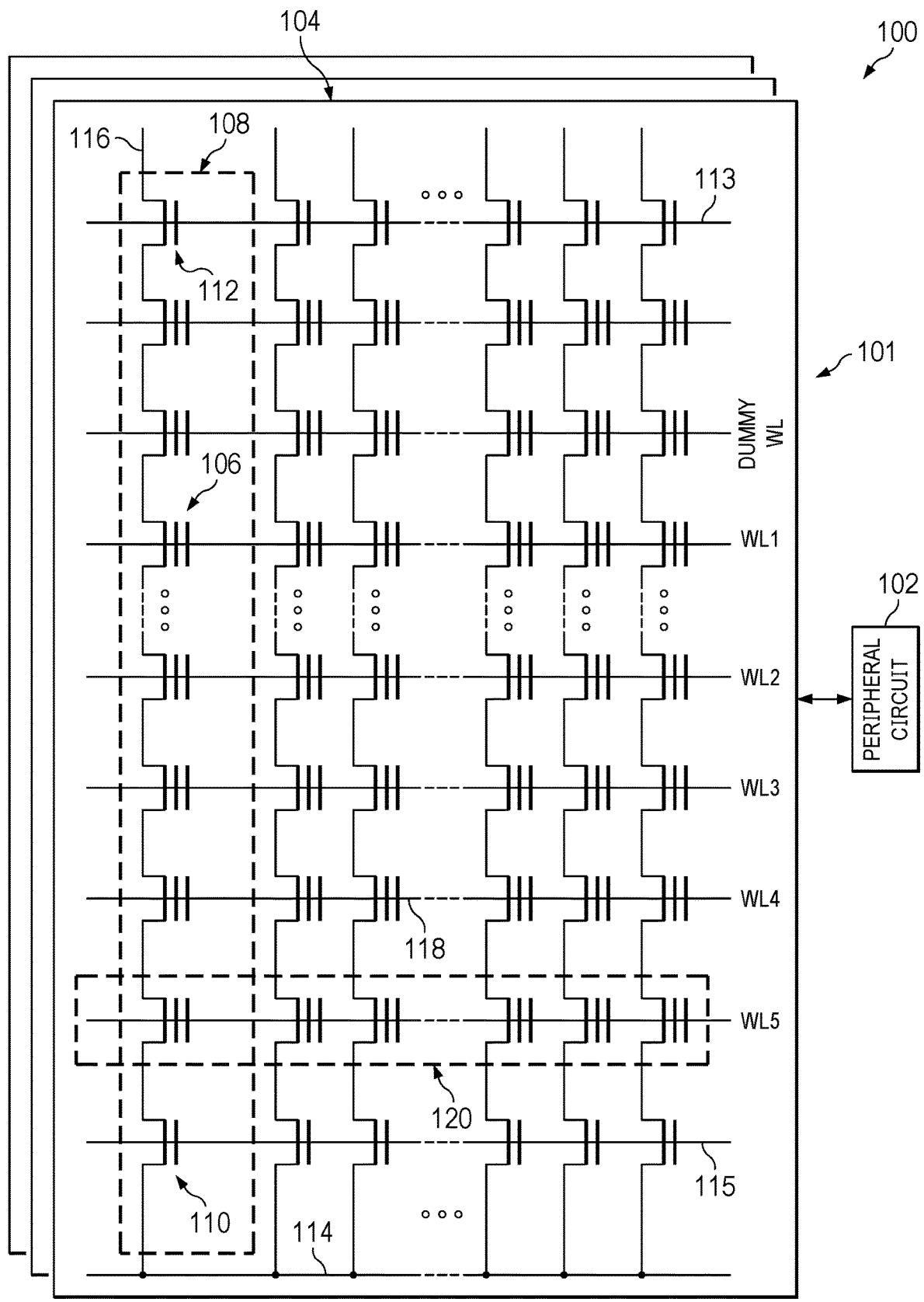
FIG. 1 illustrates a schematic circuit diagram of an example memory device including peripheral circuits, according to some aspects of the present disclosure.

A memory system can be a storage device, a memory module, or a hybrid of a storage device and memory module. In general, a host system can utilize a memory system that includes one or more memory components, such as memory devices that store data. The host system can provide data to be stored on the memory device and can request data to be retrieved from the memory device.

A memory system can include high density non-volatile memory devices where retention of data is desired when no power is supplied to the memory device. For example, NAND memory, such as three dimensional (3D) flash NAND memory, offers storage in the form of compact, high density configurations. For some types of non-volatile memory devices (e.g., NAND memory), each plane includes a set of physical blocks. Each block includes a set of pages. Each page includes a set of memory cells. A memory cell is an electronic circuit that stores information.

A single-level cell (SLC) can store only one bit per memory element/cell, whereas a multi-level cell (MLC) is a memory cell that is capable of storing more than a single bit of information. A SLC has two possible memory states that correspond to the one bit of information. A MLC has more than two memory states. For example, the MLC can store two bits per cell, three bits per cell (also known as triple-level cell (TLC)), or four bits per cell (also known as a quad-level cell (QLC)), or even more bits per cell. In some implementations, in a QLC mode, dummy word lines can be used as core word lines store data and thus increase the storage capacity. On the other hand, in a SLC mode, the dummy word lines are not used to store data to reduce its impact on ESUM (sum of voltage state intervals) of the memory device. In this disclosure, "MLC" is used to refer to a cell storing two or more bits of data including the double-level cell, triple-level cell (TLC), quad-level cell (QLC), and other higher-level cells.

Because of the nature of the operation of NAND cells, data in NAND flash memory generally cannot be overwritten, and cells are erased before new data is written to them. While the data in flash memory may be read and written at the page level, in some implementations, erasing is done at the block level or at the half block level. Therefore, data may only be programmed to a page in a block or in a half block that has previously been erased.

A storage mode switching technique is described in this disclosure that allows the memory device to change or switch a storage mode of a memory cell. For example, in some implementations, an SLC cell can be switched to a MLC cell, or vice versa, or one type of MLC cell (e.g., a TLC) can be switched to another type of MLC cell (e.g., a QLC), or vice versa. In some implementations, the storage mode switching technique supports switching any block from a higher-level MLC mode (e.g., QLC) to SLC mode or a lower-level MLC mode (e.g., TLC), for example, to leverage the higher access speed or reliability of the SLC mode or the lower-level MLC mode to achieve faster erase and program operations, or when read failure(s) are detected or the block is otherwise identified for such a storage mode switch. As an example scenario, instead of retiring worn-out blocks of MLC cells, the worn-out blocks of MLC cells can be switched to the SLC mode. Then these worn-out blocks of MLC cells can be programmed and accessed as if they were SLC cells (with certain modifications, if needed, as discussed in more detail below). By allowing switching the storage mode of the block to SLC mode or a lower-level MLC mode allows continued utilization of blocks which may otherwise be unusable in higher-level storage modes, and the lifespan of the memory device is extended.

During a program operation, a program voltage Vpgm may be applied to a selected word line, and a pass voltage Vpass may be applied to unselected word lines. During an erase operation, a bias voltage Vbias may be applied to both the selected word line and the unselected word lines, and an erase voltage Verase may be applied on a P-well (e.g., in a P-well erase mode), or on a source line and/or a bit line of a selected block (e.g., in a GIDL erase mode). The program operations and erase operations for memory cells in different storage modes can use different voltage values. For example, erase operations in a SLC mode or a lower-level MLC mode generally use lower erase voltage levels than those in a higher-level MLC mode.

To implement the storage mode switching technique, specific switch operations are designed to ensure the function and performance of the memory device. The switch operations can include switch erase operations and specific program operations. Voltages applied in the switch operations are not trivial choices because applying typical program or erase voltages in the SLC or MLC mode may lead to performance degradation after the mode switch. For example, when a block of memory cells (also referred to as a selected block) is switched from a higher-level MLC mode (e.g., QLC) to the SLC mode or a lower-level MLC mode (e.g., a TLC), continuing to use the (higher) MLC erase voltage value to perform erase operations on the block can cause the threshold voltage of a memory cell to decrease so much that the cell later on undershoots its desired threshold voltage even after multiple program pulses. This could result in certain memory cells, and especially memory cells on dummy word lines (i.e., word lines that are by default not used for storing host data), to become under-programmed (e.g., under-programmed relative to a more stringent program verify threshold voltage) and would correspondingly fail a program verify operation. Similarly, using the (lower) SLC erase voltage value to perform erase operations on the block may only reduce the threshold voltage of a memory cell so little that the cell, later on, overshoots its desired threshold voltage even on an initial program pulse, and may become over-programmed (e.g., over-programmed relative to the more stringent program verify threshold voltage). Unrecoverable read errors are likely to occur in either case, resulting in deterioration in the performance of the block.

Specific switch operations are described in this disclosure to help address the above issues. Particular implementations of the subject matter described in this disclosure can be implemented so as to realize one or more of the following advantages. For example, in some implementations, performance of a memory system can be improved to allow memory cells in a multi-level cell (MLC) mode to switch to a single-level cell (SLC) or a lower-level MLC mode, achieving more reliable performance and extending the useful lifespan of a memory device. Further, the described techniques, in some cases, allow a SLC or a lower-level MLC mode to switch to a higher-level MLC mode, improving the storage capacity of the memory device by leveraging the memory cells are on a dummy word line without adding hardware cost. By using a designed switch erase or switch program voltage to access such blocks, the voltage distributions of the memory cells in the block can be maintained within a desired range and withheld from being shifted too far or too little. The described techniques can improve reliability of the memory system and decrease error rates.

FIG. 1 illustrates a schematic circuit diagram of an example memory device 100 including peripheral circuits 102, according to some aspects of the present disclosure. The memory device 100 can include a memory cell array 101 and peripheral circuits 102 coupled to memory cell array 101. Memory cell array 101 can, for example, be a NAND Flash memory cell array in which memory cells 106 are provided in the form of an array of NAND memory strings 108, each of which extends vertically above a substrate. In some implementations, each NAND memory string 108 includes multiple memory cells 106 coupled in series and stacked vertically. Each memory cell 106 can hold a continuous, analog value, such as an electrical voltage or charge, that depends on the number of electrons trapped within a region of memory cell 106. Each memory cell 106 can be either a floating gate type of memory cell including a floating-gate transistor or a charge trap type of memory cell including a charge-trap transistor.

In some implementations, each memory cell 106 can have a respective storage mode, such as a single-level cell (SLC) or a multi-level cell (MLC). A SLC has two possible memory states and thus, can store one bit of data. For example, the first memory state "0" can correspond to a first range of voltages, and the second memory state "1" can correspond to a second range of voltages. A MLC is capable of storing more than a single bit of data in more than two memory states. For example, the MLC can store two bits per cell, three bits per cell (also known as triple-level cell (TLC)), or four bits per cell (also known as a quad-level cell (QLC)). Each MLC can have multiple possible memory states and be programmed to assume a range of possible nominal storage values. In one example, if each MLC stores two bits of data, then the MLC can have four possible memory states and be programmed to assume four nominal storage values; one of three possible programming levels from an erased state by writing one of three possible nominal storage values to the cell. A fourth nominal storage value can be used for the erased state.

As shown in FIG. 1, each NAND memory string 108 can also include a source select gate (SSG) transistor 110 at its source end and a drain select gate (DSG) transistor 112 at its drain end. SSG transistor 110 and DSG transistor 112 can be configured to activate select NAND memory strings 108 (columns of the array) during read and program operations. In some implementations, the sources of NAND memory strings 108 in the same block 104 are coupled through a same source line (SL) 114, e.g., a common SL. In other words, all NAND memory strings 108 in the same block 104 have an array common source (ACS), according to some implementations. The drain of each NAND memory string 108 is coupled to a respective bit line 116 from which data can be read or written via an output bus, according to some implementations. In some implementations, each NAND memory string 108 is configured to be selected or deselected by applying a DSG select voltage or a DSG unselect voltage to the gate of respective DSG transistor 112 through one or more DSG lines 113 and/or by applying an SSG select voltage or an SSG unselect voltage to the gate of respective SSG transistor 110 through one or more SSG lines 115.

As shown in FIG. 1, NAND memory strings 108 can be organized into multiple blocks 104, each of which can have a common source line 114, e.g., coupled to an ACS. In some implementations, each block 104 is the basic data unit for erase operations, i.e., all memory cells 106 on the same block 104 are erased at the same time. Memory cells 106 of adjacent NAND memory strings 108 can be coupled through word lines 118 that select which row of memory cells 106 is affected by read and program operations. In some implementations, each word line 118 is coupled to a page 120 of memory cells 106. The size of one page 120 in bits can relate to the number of NAND memory strings 108 coupled by word line 118 in one block 104. Each word line 118 can include multiple control gates (gate electrodes) at each memory cell 106 on respective page 120 and a gate line coupling the control gates.

Figure 2:
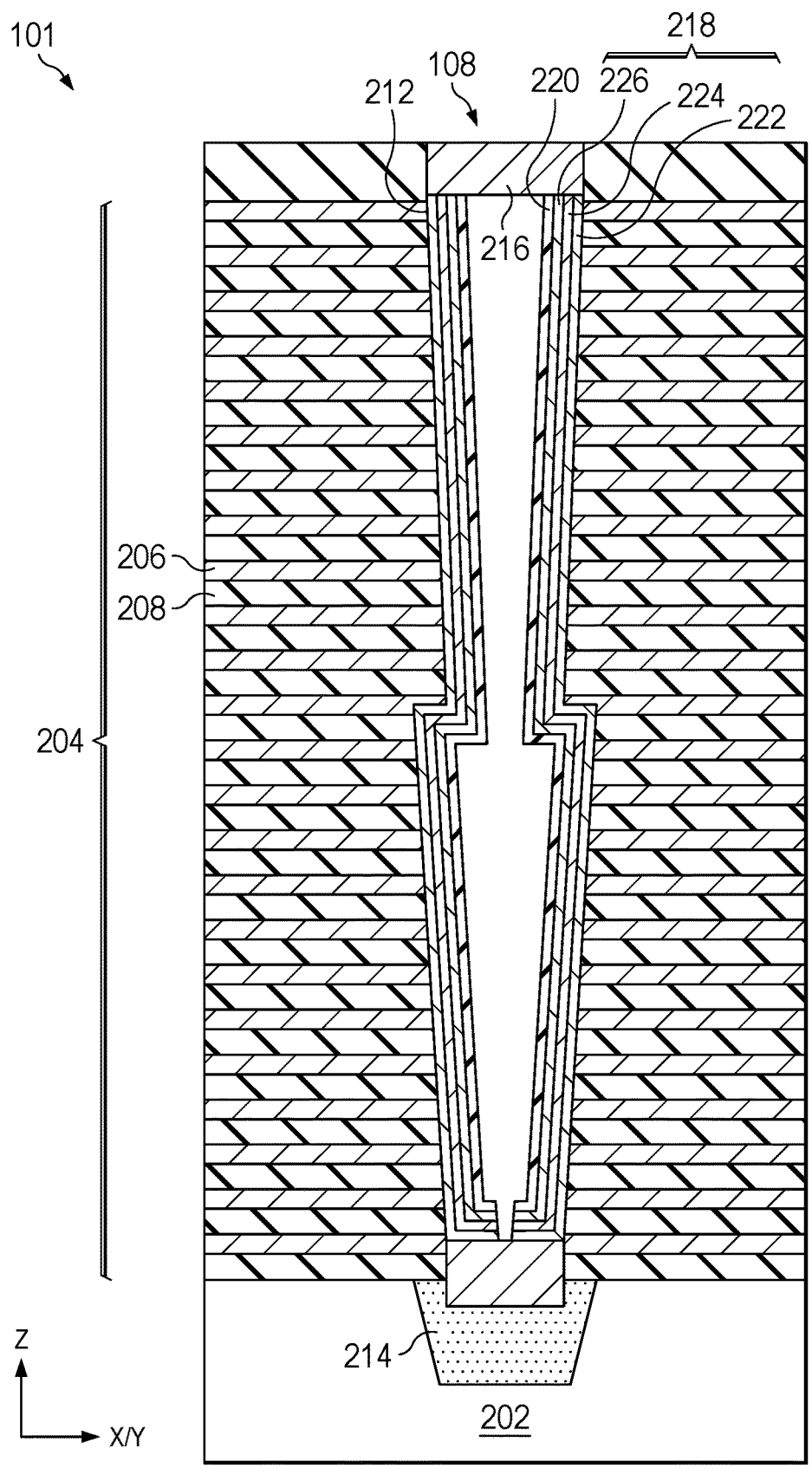
FIG. 2 illustrates a side view of cross-sections of an example memory cell array including a NAND memory string, according to some aspects of the present disclosure.

FIG. 2 illustrates a side view of cross-sections of an example memory cell array 101 including a NAND memory string 108 illustrated in FIG. 1, according to some aspects of the present disclosure. As shown in FIG. 2, NAND memory string 108 can extend vertically through a memory stack 204 above a substrate 202. Substrate 202 can include silicon (e.g., single crystalline silicon), silicon germanium (SiGe), gallium arsenide (GaAs), germanium (Ge), silicon on insulator (SOI), germanium on insulator (GOI), or any other suitable materials. Here x, y, and z axes are included in FIG. 2 to further illustrate the spatial relationship of the components in a memory device. Substrate 202 includes two lateral surfaces extending laterally in the x-y plane: a top surface on the front side of the wafer on which the memory device can be formed, and a bottom surface on the backside opposite to the front side of the wafer. The z-axis is perpendicular to both the x and y axes. As used herein, whether one component (e.g., a layer or a device) is "on," "above," or "below" another component (e.g., a layer or a device) of the memory device is determined relative to the substrate 202 of the memory device in the z-direction (the vertical direction perpendicular to the x-y plane) when substrate 202 is positioned in the lowest plane of the memory device in the z-direction. The same notion for describing the spatial relationships is applied throughout the present disclosure.

Memory stack 204 can include interleaved gate conductive layers 206 and gate-to-gate dielectric layers 208. The number of the pairs of gate conductive layers 206 and gate-to-gate dielectric layers 208 in memory stack 204 can determine the number of memory cells 106 in memory cell array 101. Gate conductive layer 206 can include conductive materials including, but not limited to, tungsten (W), cobalt (Co), copper (Cu), aluminum (Al), polysilicon, doped silicon, silicides, or any combination thereof. In some implementations, each gate conductive layer 206 includes a metal layer, such as a tungsten layer. In some implementations, each gate conductive layer 206 includes a doped polysilicon layer. Each gate conductive layer 206 can include the control gates of memory cells 106, the gates of DSG transistors 112, or the gates of SSG transistors 110, and can extend laterally as DSG line 113 in the upper portion of memory stack 204, SSG line 115 in the lower portion of memory stack 204, or word line 118 between DSG line 113 and SSG line 115. Although one SSG line 115 and one DSG line 113 are shown in FIG. 2, the number of SSG lines 115 and the number of DSG lines 113 (as well as the numbers of SSG transistors 110 and DSG transistors 112 coupled to the SSG lines 115 and DSG lines 113, respectively) may vary in other examples.

As shown in FIG. 2, NAND memory string 108 includes a channel structure 212 extending vertically through memory stack 204. In some implementations, channel structure 212 includes a channel opening filled with semiconductor material(s) (e.g., as a semiconductor channel 220) and dielectric material(s) (e.g., as a memory film 218). In some implementations, semiconductor channel 220 includes silicon, such as polysilicon. In some implementations, memory film 218 is a composite dielectric layer including a tunneling layer 226, a storage layer 224 (also known as a "charge trap layer"), and a barrier layer 222. Channel structure 212 can have a cylinder shape (e.g., a pillar shape). Semiconductor channel 220, tunneling layer 226, storage layer 224, and barrier layer 222 are arranged radially from the center toward the outer surface of the pillar in this order, according to some implementations. Tunneling layer 226 can include silicon oxide, silicon oxynitride, or any combination thereof. Storage layer 224 can include silicon nitride, silicon oxynitride, silicon, or any combination thereof. Barrier layer 222 can include silicon oxide, silicon oxynitride, high dielectric constant (high-k) dielectrics, or any combination thereof. In one example, memory film 218 may include a composite layer of silicon oxide/silicon oxynitride/silicon oxide (ONO).

As shown in FIG. 2, a well 214 (e.g., a P-well (a P-type doped region) and/or an N-well) is formed in substrate 202, and the source of NAND memory string 108 is in contact with well 214, according to some implementations. The source line 114 and/or bit line 116 of each of one or more blocks 104 may be coupled to well 214. As described above, during and after discharging the program voltage in a program operation in response to an interrupt, holes may be attracted from well 214 (e.g., P-well) and accumulated in semiconductor channel 220 and storage layer 224 due to a negative potential coupled in semiconductor channel 220. In some implementations, NAND memory string 108 further includes a channel plug 216 at the drain end of NAND memory string 108, e.g., as part of the drain of NAND memory string 108.

Referring back to FIG. 1, peripheral circuits 102 can be coupled to memory cell array 101 through bit lines 116, word lines 118, source lines 114, SSG lines 115, and DSG lines 113. Peripheral circuits 102 can include any suitable analog, digital, and mixed-signal circuits for facilitating the operations of memory cell array 101 by applying and sensing voltage signals and/or current signals to and from each target (selected) memory cell 106 through bit lines 116, word lines 118, source lines 114, SSG lines 115, and DSG lines 113. Peripheral circuits 102 can include various types of peripheral circuits formed using metal-oxide-semiconductor (MOS) technologies.

Figure 3:
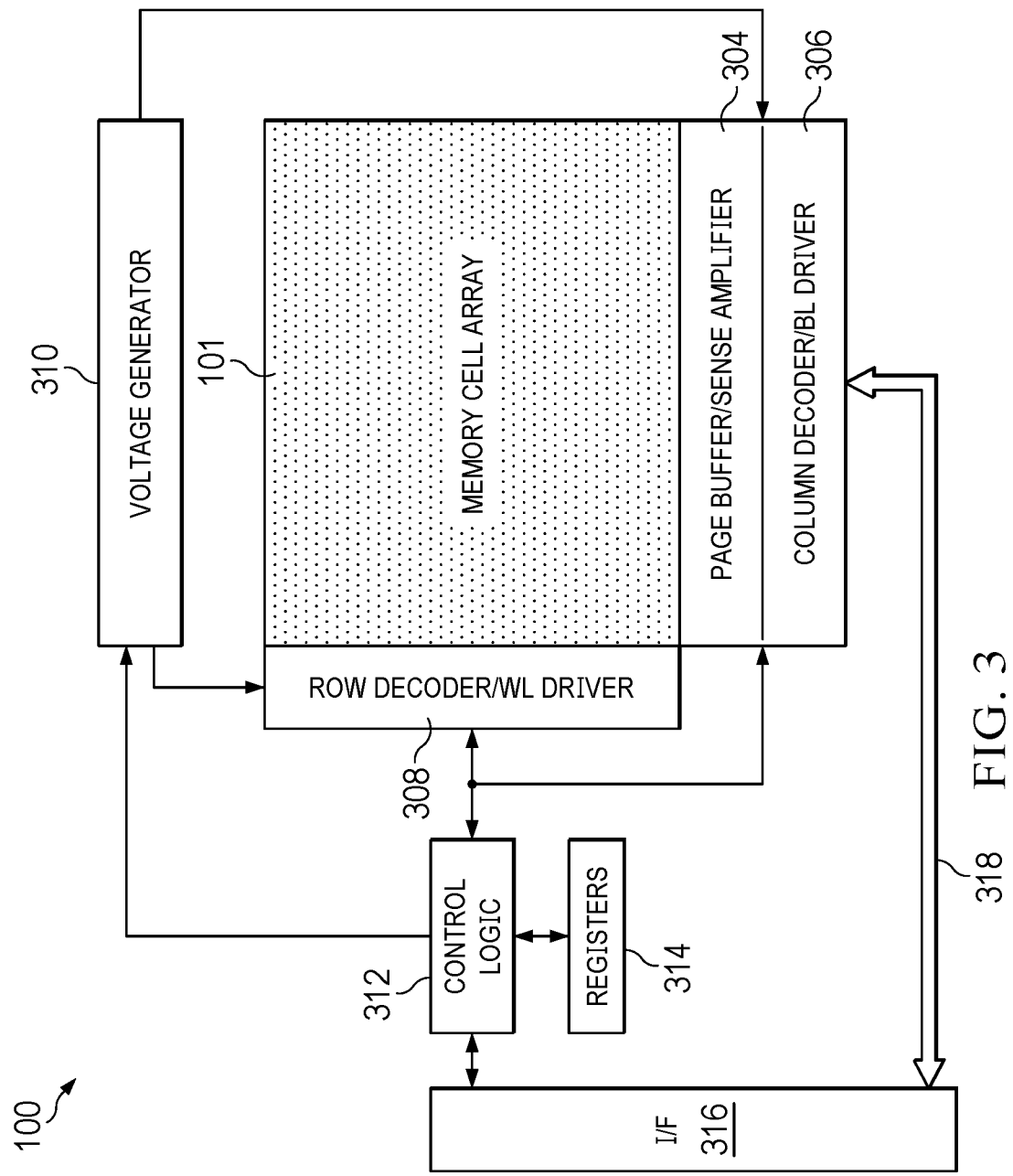
FIG. 3 illustrates a block diagram of an example memory device including a memory cell array and peripheral circuits, according to some aspects of the present disclosure.

FIG. 3 illustrates a block diagram of an example memory device 300 including the memory cell array 101 and the peripheral circuits 102, according to some aspects of the present disclosure. Specifically, FIG. 3 illustrates the example peripheral circuits 102 including a page buffer/sense amplifier 304, a column decoder/bit line driver 306, a row decoder/word line driver 308, a voltage generator 310, control logic 312, registers 314, an interface 316, and a data bus 318. In some examples, additional peripheral circuits not shown in FIG. 3 may be included as well.

Page buffer/sense amplifier 304 can be configured to read and program (write) data from and to memory cell array 101 according to the control signals from control logic 312. In one example, page buffer/sense amplifier 304 may store one page of program data (write data) to be programmed into one page 120 of memory cell array 101. In another example, page buffer/sense amplifier 304 may perform program verify operations to ensure that the data has been properly programmed into select memory cells 106 coupled to selected word lines 118. In yet another example, page buffer/sense amplifier 304 may also sense the low power signals from bit line 116 that represents a data bit stored in memory cell 106 and amplify the small voltage swing to recognizable logic levels in a read operation. Column decoder/bit line driver 306 can be configured to be controlled by control logic 312 and select one or more NAND memory strings 108 by applying bit line voltages generated from voltage generator 310.

Row decoder/word line driver 308 can be configured to be controlled according to the control signals by control logic 312 and selected/unselected blocks 104 of memory cell array 101 and selected/unselected word lines 118 of block 104. Row decoder/word line driver 308 can be further configured to drive word lines 118 using word line voltages generated from voltage generator 310. In some implementations, row decoder/word line driver 308 can also select/deselect and drive SSG lines 115, and DSG lines 113 as well using SSG voltages and DSG voltages generated from voltage generator 310.

Voltage generator 310 can be configured to be controlled by control logic 312 and generate the various word line voltages (e.g., erase voltage, read voltage, program voltage, pass voltage, verification voltage), SSG voltages (e.g., select/unselect voltages), DSG voltages (e.g., select/unselect voltages), bit line voltages (e.g., ground voltage), and source line voltages (e.g., ground voltage) to be supplied to memory cell array 101.

Control logic 312 can be coupled to each peripheral circuit described above and configured to control the operations of each peripheral circuit. Registers 314 can be coupled to control logic 312 and include status registers, command registers, and address registers for storing status information, command operation codes (OP codes), and command addresses for controlling the operations of each peripheral circuit.

In some cases, control logic 312 can receive an erase command issued by a memory controller (e.g., memory controller 3000 in FIGS. 25 and 26A-26B) and send control signals to various peripheral circuits, such as row decoder/word line driver 308, column decoder/bit line driver 306, and voltage generator 310 to initiate the erase operation on the memory cells 106 coupled to both selected and unselected word lines 118.

Similarly, in some cases, control logic 312 can receive a program command issued by a memory controller (e.g., memory controller 3000 in FIGS. 25 and 26A-26B) and send control signals to various peripheral circuits, such as row decoder/word line driver 308, column decoder/bit line driver 306, and voltage generator 310 to initiate the program operation on the memory cells 106 coupled to the selected word line 118.

Interface 316 can be coupled to control logic 312 and act as a control buffer to buffer and relay control commands received from a memory controller (e.g., memory controller 3000 in FIGS. 25 and 26A-26B) to control logic 312 and status information received from control logic 312 to the memory controller. Interface 316 also can be coupled to column decoder/bit line driver 306 via data bus 318 and act as a data input/output (I/O) interface and a data buffer to buffer and relay the data to and from memory cell array 101.

Figure 4:
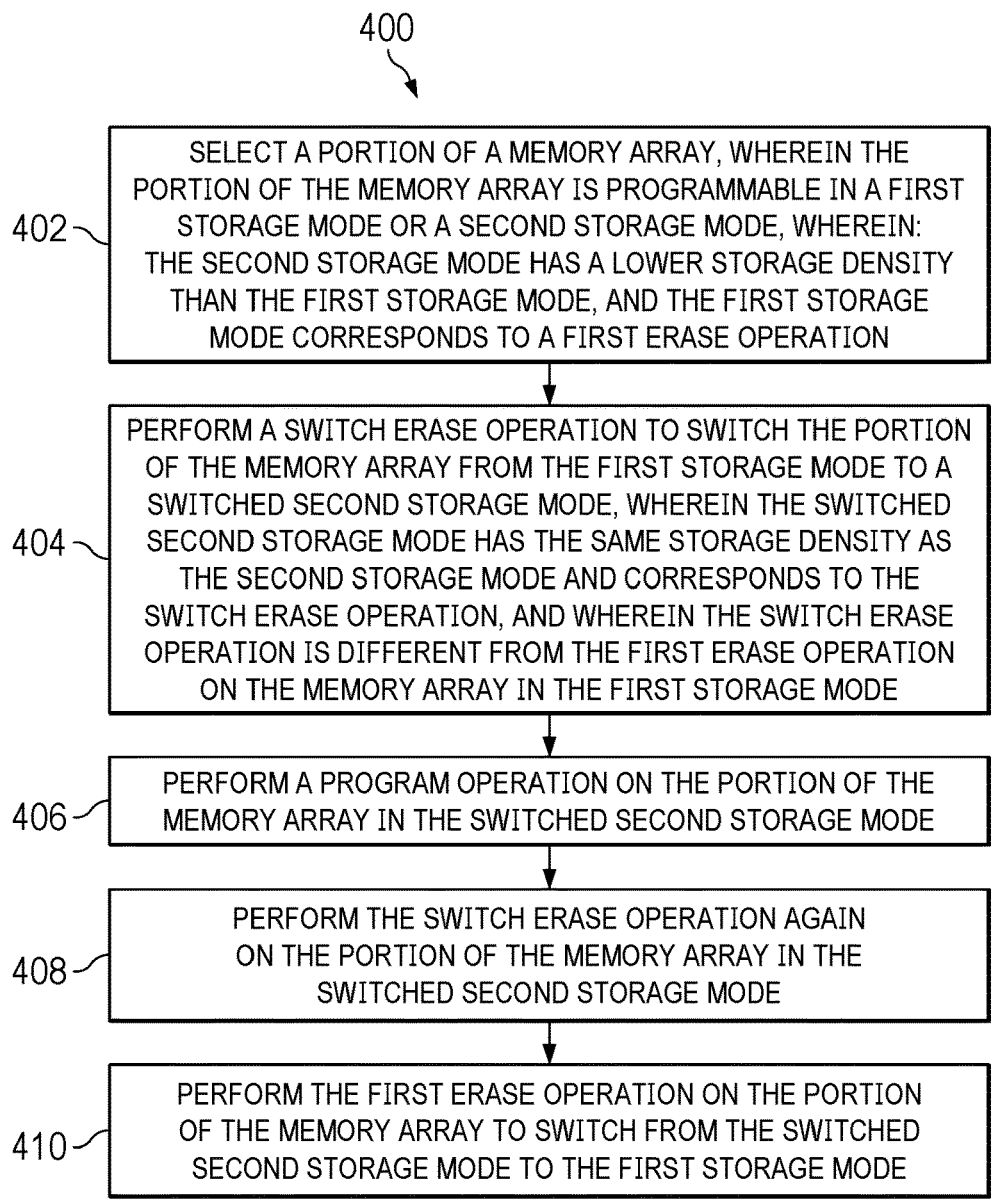
FIG. 4 illustrates a flowchart of an example process for performing switch erase operations, according to some aspects of the present disclosure.

FIG. 4 illustrates a flowchart of an example process 400 for performing switch erase operations, according to some aspects of the present disclosure. The process 400 can be implemented by one or more computer programs installed on one or more computers in one or more locations and programmed in accordance with this disclosure. For example, the process 400 can be performed by the memory device shown in FIG. 1. For convenience, the process 400 will be described as being performed by a memory system including a memory device (e.g., memory device 100). The memory device includes a memory cell array and peripheral circuits (e.g., memory cell array 101 and peripheral circuits 102). The peripheral circuits include the control logic of the memory device (e.g., as shown in FIG. 3). In some implementations, some or all of the operations in the example process 400 can be implemented based on the techniques described in connection with FIGS. 1-3 and 5-12. The operations shown in process 400 may not be exhaustive and that other operations can be performed as well before, after, or between any of the illustrated operations. Further, some of the operations may be performed simultaneously, or in a different order than shown in FIG. 4.

The memory system selects a portion of a memory cell array (402), for example, to perform a switch erase operation. In some implementations, this selection may be due to some control signals and/or commands issued by the control logic in the peripheral circuits and/or a memory controller of the memory device. In some implementations, this selection may be due to an above threshold number of unrecoverable read errors or some number of read retries for a read of data from the memory device. In some implementations, this selection may be due to some other indication of unreliability or wear in the memory device.

In general, the memory system can select any portion of the memory cell array to perform the switch erase operation. In some cases, the memory system can select a block of memory cells included in multiple blocks included in the memory array. In some cases, the memory system can select a half block of memory cells, which includes a portion of the pages of a block, e.g., such as a half (e.g., either the upper half or the lower half) or another number of the pages of the block in the multiple of blocks included in the memory array. In other cases, the memory system can select a sub-block, which includes any portion of pages of a block, e.g., a quarter block.

The portion of the memory array is programmable in a first storage mode or a second storage mode, where the second storage mode has a lower storage density than the first storage mode. For example, the first storage mode can be a QLC mode, where the memory cells store two bits of data per cell, while the second storage mode can be a SLC mode, where the memory cells store one single bit of data per cell. More generally, the first storage mode can be a MLC mode, where the memory cell stores two, three, four, or more bits of data per cell. Each storage mode corresponds to a respective erase operation and program operation. For example, the first storage mode corresponds to a first erase operation, and the second storage mode corresponds to a second erase operation. The first and the second erase operations differ in at least a voltage value of an erase voltage pulse, i.e., the magnitude of an erase voltage pulse.

Figure 5:
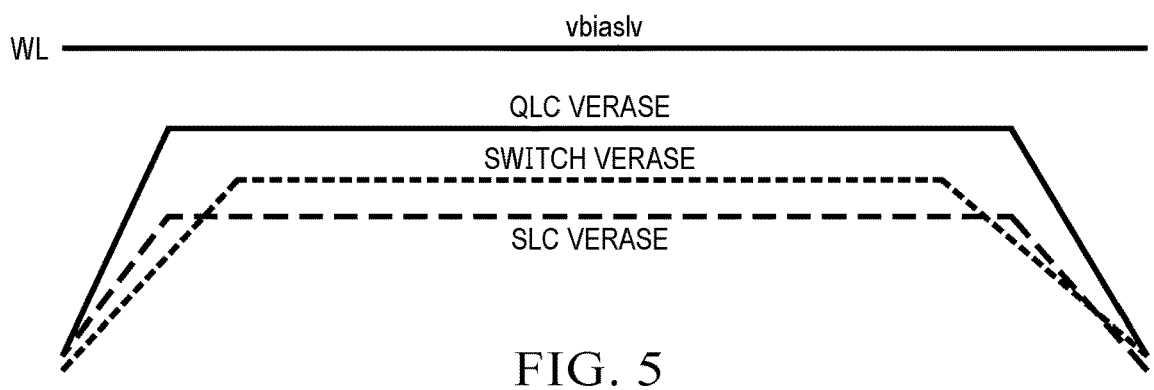
FIG. 5 illustrates a waveform diagram of different erase operations in different storage modes, according to some aspects of the present disclosure.

FIG. 5 illustrates a waveform diagram of different erase operations in different storage modes, according to some aspects of the present disclosure. As illustrated in the bottom half of FIG. 5, an erase operation that corresponds to a QLC mode can use an erase voltage pulse having the higher voltage value ("QLC VERASE"), whereas an erase operation that corresponds to a SLC mode can use an erase voltage having the lower voltage value ("SLC VERASE").

Referring back to FIG. 4, the memory system performs a switch erase operation to switch the portion of the memory array from the first storage mode to a switched second storage mode (404). The switched second storage mode has the same storage density as the second storage mode but may require a different erase operation and/or program operation in the switched second storage mode. For example, in the example where the second storage mode is a SLC mode, the switched second storage mode is a switched SLC mode. Similar to the regular SLC mode, the switched SLC mode stores only one bit of data per cell. However, the erase operation in the switched SLC mode may have a different voltage than the one in the regular SLC mode, while the program operation in the switched SLC mode may have the same voltage as the one in the regular SLC mode. In other words, following the switch erase operation, the memory system will continue to program and access the selected portion of the memory array as if they were in the second storage mode (even though they were in the first storage mode with higher storage density at step 402) by storing only one bit of data per cell using erase operation and program operation corresponding to the switched SLC mode, rather than blindly reusing the same erase operation and program operation corresponding to the regular SLC mode.

In some implementations, the switch erase operation is different from both the regular erase operation that corresponds to the first storage mode (e.g., QLC mode) and the regular erase operation that corresponds to the second storage mode (e.g., SLC mode). In other words, in order to be programmed and accessed as if they were in the second storage mode instead of in the first storage mode, the selected portion of the memory array is erased by a switch erase operation that is different from both the erase operation that corresponds to the first and the erase operation that corresponds to the second storage mode.

As illustrated in the bottom half of FIG. 5, the switch erase operation can use an erase voltage pulse having a voltage value ("switch VERASE") that is lower than the QLC erase voltage value ("QLC VERASE") but higher than the SLC erase voltage value ("SLC VERASE"), all relative to a same bias voltage ("vbiaslv") on a word line. While FIG. 5 illustrates the three voltage pulses as having different pulse lengths, i.e., as having different durations, in some implementations, this is not required. In fact, in some implementations, two or more of the three erase voltage pulses can have the same duration.

Referring back to FIG. 4, in some cases, after the portion of the memory array is switched into the switched second storage mode, the memory system performs a program operation on the portion of the memory array in the switched second storage mode (406). The program operation can be the same as the regular program operation that would be performed by the memory system on any portion of the memory array in the second storage mode (e.g., SLC mode). In other words, once the memory system has performed steps 402-404 to switch the portion of the memory array from the first storage mode into the switched second storage mode, the memory system can continue to program and access the portion of the memory array as if it were in the second storage mode by using regular program operations that correspond to the second storage mode.

In some cases, the memory system performs the switch erase operation again on the portion of the memory array in the switched second storage mode (408). The switch erase operation can be the same as, and in particular can use the same switch erase voltage value as, the switch erase operation performed in step 404. Unlike program operations which could the same as regular program operations that correspond to the second storage mode, once switched into the switched second storage mode, the erase operation to be performed on the portion of the memory array will generally be different from the regular, second erase operations that correspond to the second storage mode.

In some cases, the memory system can switch the portion of the memory array from the switched second storage mode back to the first storage mode. To do so, in some cases, the memory system performs the first erase operation on the portion of the memory array to switch from the switched second storage mode to the first storage mode (410). The first erase operation is a regular, first erase operation that corresponds to the first storage mode. This switches the portion of the memory array back to its original storage mode that it was in before step 402 was performed. In other words, performing the regular, first erase operation, i.e., instead of the switch erase operation, to erase the portion of the memory array enables the memory system to continue to program and access the portion of the memory array using the program and erase operations that correspond to the first storage mode.

Figure 6:
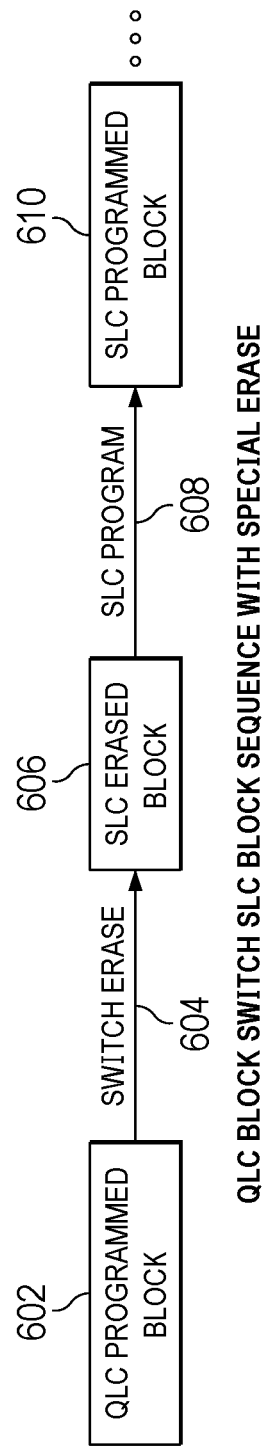
FIG. 6 illustrates an example process of performing the switch erase operations according to FIG. 4 on a block of a memory device, according to some aspects of the present disclosure.

FIG. 6 illustrates an example process of performing the switch erase operations according to FIG. 4 on a block of a memory device, according to some aspects of the present disclosure. The block can include one or more pages of memory cells. At 602, the block begins with being programmed in a QLC mode (referred to as a "QLC programmed block" or in a "QLC programmed state"). At 604, a switch erase operation is performed on the block to erase the block and enter a SLC erased state that mimics an erased state of a regular SLC mode, which prepares the block to be later programmed according to the SLC mode. As discussed in connection with FIG. 4, performing the switch erase operation includes using a specifically designed switch erase voltage (e.g., switch VERASE) to prevent over-erasing the memory cell and causing the memory cell, later on, to undershoot its desired threshold voltage even after multiple program pulses in the SLC mode.

Following the switch erase operation, at 606, the block is erased and is in the SLC erased state (referred to as a SLC erased block) with characteristics (e.g., including threshold voltage and ESUM characteristics) that are similar to the erased state in the regular SLC mode. Further, the block is now switched from the QLC mode to a switched SLC mode, resulting in a lower storage density of the memory cells in the block than the QLC mode. At 608, an SLC program operation is performed on (e.g., the selected pages of) the block. The SLC program operation can use a regular program voltage value of a regular program operation that corresponds to the SLC mode in the memory device. Following the SLC program operation, at 610, the block is programmed according to the SLC mode. The block is (being treated as if it were) in the SLC mode. The block can be further erased by the switch erase operation and be programmed by the SLC program operation in the switched SLC mode.

Figure 7:
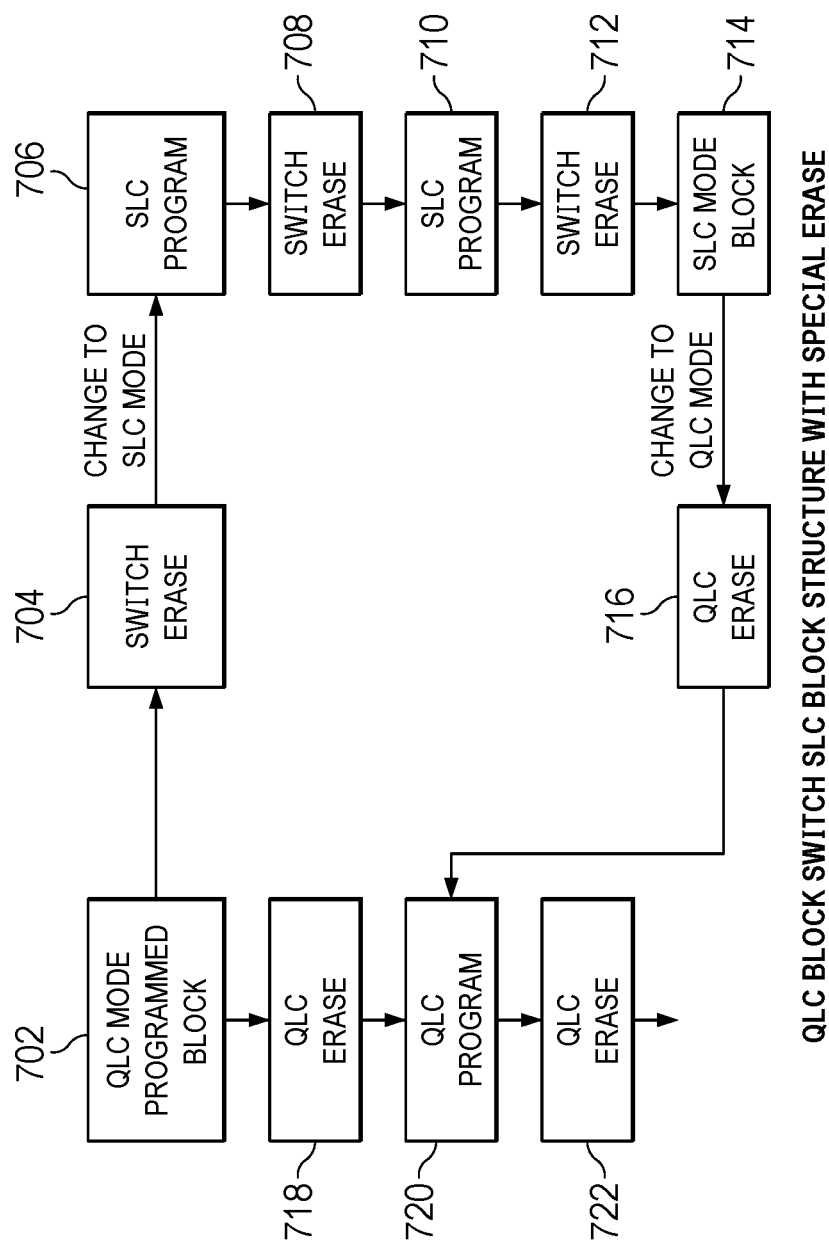
FIG. 7 illustrates another example technique of performing the switch erase operations according to FIG. 4 on a block of a memory device, according to some aspects of the present disclosure.

FIG. 7 illustrates another example technique of performing the switch erase operations according to FIG. 4 on a block of a memory device, according to some aspects of the present disclosure. The block can include one or more pages of memory cells. At 702, the block begins with being programmed in a QLC programmed mode. At 704, a switch erase operation is performed on the block to erase the block as well as to facilitate the switch of the block from the QLC mode to a switched SLC mode. From 704 and going forward until 716, the block can now be programmed and accessed as if it were in the SLC mode. Specifically, at 706, an SLC program operation is performed to program the block. The SLC program operation can use a program voltage value of a regular program operation that corresponds to the SLC mode in the memory device. At 708, a switch erase operation is performed to erase the block which was programmed by using the SLC program operation performed at 706. At 710 and 712, another iteration of SLC program and switch erase operations can be performed. At 714, the block, which has been erased, is (being treated as if it were) in the SLC mode. To erase the block and, in particular, to switch the mode of the block from the SLC mode back to the QLC mode, at 716, a regular QLC erase operation (rather than the switch erase operation) that corresponds to the QLC mode in the memory device is performed.

Turning back to 702 where the block begins with being programmed in the QLC mode, at 718, assuming that a regular QLC erase operation is performed, then the block will be erased, and will remain in the QLC mode. In other words, following both 716 and 718, the block will become an erased block in the QLC mode. Thus, at 720, a QLC program operation can be performed on the block to program the block. Following the QLC program operation, at step 722, a QLC erase operation can be performed on the block to erase the block according to the QLC mode. In 720 and 722, the QLC program operation and the QLC erase operation can use program and erase voltage values of the regular program and erase operations that correspond to the QLC mode in the memory device, respectively.

Figure 8:
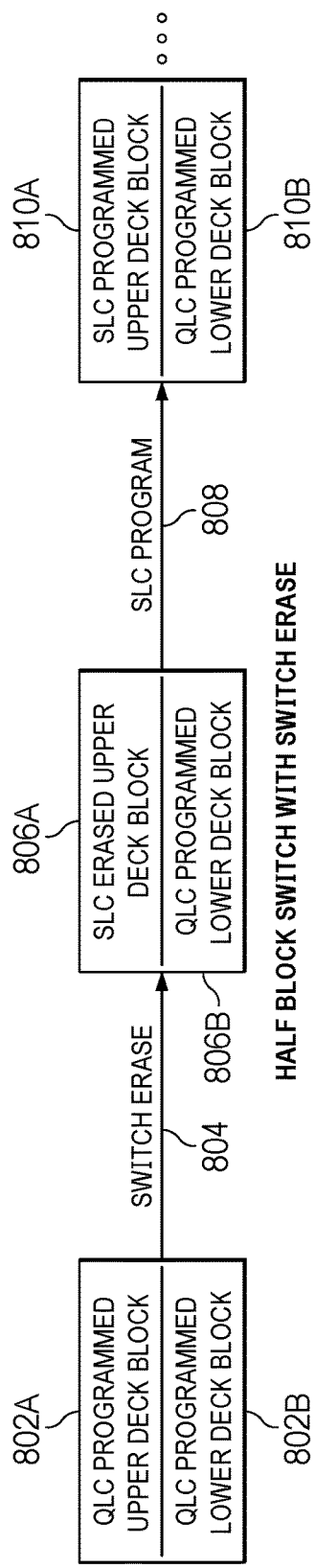
FIG. 8 illustrates an example technique of performing the switch erase operations according to FIG. 4 on a half block of a memory device, according to some aspects of the present disclosure.

FIG. 8 illustrates an example technique of performing the switch erase operations according to FIG. 4 on a half block of a memory device, according to some aspects of the present disclosure. The half block can include a portion of the memory cells of a block of the memory device. In the example of FIG. 8, the half block is the upper half of the block, although in other examples, the half block could alternatively be the lower half of the block, or in another location within the block. At 802A and 802B, the block including both its upper and lower halves begins with being programmed in a QLC programmed mode. At 804, a switch erase operation is performed on the upper half block to erase the upper half block. In some implementations, this can be done by allowing the word lines of the non-selected lower half of the block to float, while the word lines of the selected upper half of the block are applied with a switch bias voltage of the switch erase operation. As the word lines of the non-selected lower half of the block are left to float, the word line voltage levels are pulled up so these memory cells in the non-selected lower half of the block are not erased.

Following the switch erase operation, at 806A, the upper half block is erased and is now in the SLC mode. By contrast, at 806B, the lower half block is still programmed in the QLC mode (unchanged from 802B). At 808, a SLC program operation is performed on the upper half block to program the upper half block. The SLC program operation can use a program voltage value of a regular program operation that corresponds to the SLC mode in the memory device. Following the SLC program operation, at 810A, the upper half block, which is (being treated as if it were) in the SLC mode, is now programmed. At 810B, the lower half block remains programmed in the QLC mode (unchanged from 802B).

Figure 9:
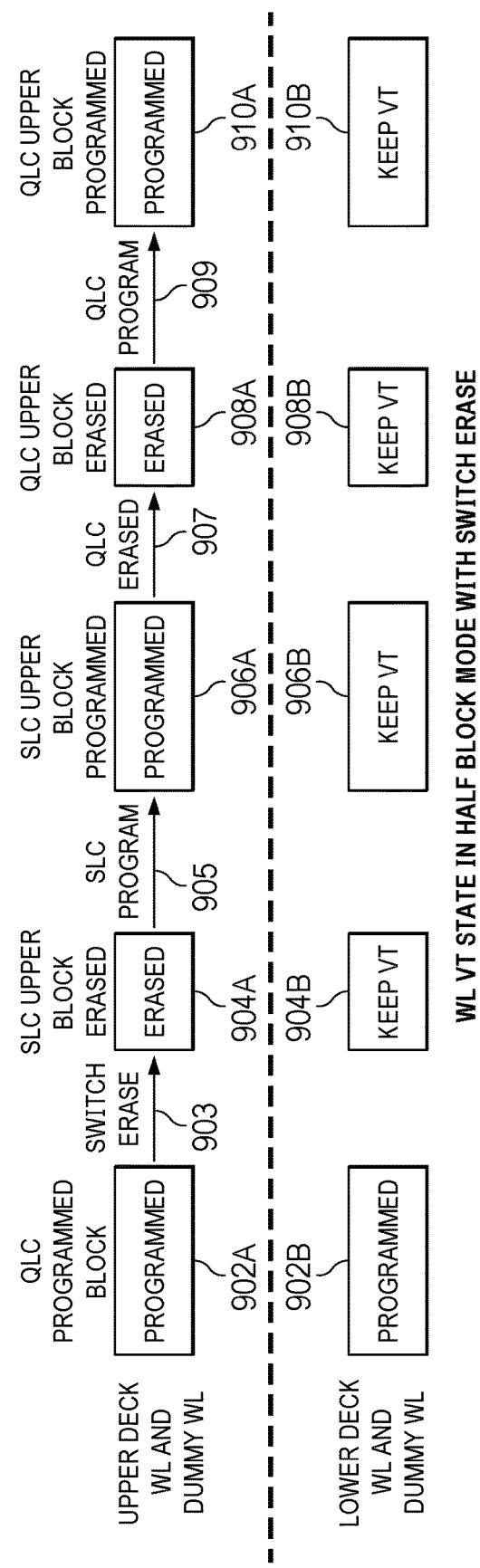
FIG. 9 illustrates another example technique of performing the switch erase operations according to FIG. 4 on a half block, according to some aspects of the present disclosure.

FIG. 9 illustrates another example technique of performing the switch erase operations according to FIG. 4 on a half block, according to some aspects of the present disclosure. The half block can include half of the memory cells of a block of the memory device. In the example of FIG. 9, the half block is the upper half of the block, including dummy word lines, although in other examples, the half block could alternatively be the lower half of the block, or in another location within the block.

At 902A and 902B, the block including both its upper and lower halves begins with being programmed in a QLC mode. At 903, a switch erase operation is performed on the upper half block to erase the upper half block. Following the switch erase operation, at 904A, the upper half block is erased and is now in the SLC mode. At 905, a SLC program operation is performed on the upper half block to program the upper half block. Following the SLC program operation, at 906A, the upper half block, which is (being treated as if it were) in the SLC mode, is now programmed according to the SLC mode. At 907, a QLC erase operation is performed on the upper half block to erase the upper half block. Following the QLC erase operation, at 908A, the upper half block is erased. Further, because the regular QLC erase operation and instead of the switch erase operation was performed, the upper half block is switched back to the QLC mode from the SLC mode. At 909, a QLC program operation is performed on the upper half block, which is in the QLC mode, to program the upper half block. Following the QLC program operation, at 910A, the upper half block is programmed and is in the QLC mode.

By contrast, the lower half block is not affected by the operations at 903, 905, 907, and 909 and thus remains programmed in the QLC mode from 904B, 906B, 908B, to 910B (unchanged from 902B). Accordingly, the threshold voltage distribution of the lower half block remains unchanged.

Referring back to FIG. 4, in some implementations, each erase operation uses a single erase voltage pulse, while in some other implementations, each erase operation can use a sequence of multiple erase voltage pulses. The sequence of erase voltage pulses may have increasing values, starting with an initial pulse having an initial erase voltage value. Thus, if a sequence of multiple erase voltage pulses are used, the switch erase operation can differ from the first and second erase operations in the first and second modes at least in their respective initial voltage values of initial erase voltage pulses in the sequence.

The memory system can perform the switch erase operation by applying an effective switch erase voltage, which is lower than the first effective erase voltage of the first erase operation that corresponds to the first storage mode. In some implementations, the effective switch erase voltage is also higher than the second effective erase voltage of the second erase operation that corresponds to the second storage mode.

In some implementations, the memory system can perform the switch erase operation in either one of at least two different ways, such as, according to a P-well erase or a gate-induce-drain-leakage (GIDL) erase.

As one example, the erase operation can be a P-well erase operation, for example, as shown in FIG. 5. For the first erase operation (that corresponds to the first storage mode), the memory system applies the first effective erase voltage, for example, by applying a first bias voltage ("vbiaslv") on a word line (e.g., a word line of a selected block) and applying a first erase voltage on a P-well in substrate. As a result, the first effective erase voltage is the difference between the first erase voltage applied to the P-well and the first bias voltage applied on the word line. By contrast, for the switch erase operation, the memory system applies the effective switch erase voltage, for example, by applying a switch bias voltage on the word line and applying a switch erase voltage on the P-well in substrate. Accordingly, the effective switch erase voltage is the difference between the switch erase voltage on the P-well and the switch bias voltage on the word line. Different implementations can be used to make the effective switch erase voltage lower than the first effective erase voltage.

As one example implementation to make the effective switch erase voltage lower than the first effective erase voltage, the first bias voltage and the switch bias voltage may have the same value, while the switch erase voltage value is set to be lower than the first erase voltage value (e.g., as shown in FIG. 5). When a lower switch erase voltage is applied to the selected block, its effective erase voltage is correspondingly reduced, thus reducing the erase stress on the memory cell of the selected block.

As another example implementation to make the effective switch erase voltage lower than the first effective erase voltage, the first erase voltage and the switch erase voltage may have the same value, while the switch bias voltage value is set to be higher than the first bias voltage value. When a higher switch bias voltage is applied to the word line, its effective erase voltage is effectively reduced, thus similarly reducing the erase stress on the memory cell of the selected block. For example, in the MLC mode, the same bias voltage is applied to the dummy word line and the core word line, while in the SLC mode, the dummy word line is set to float. In this example implementation, while the first erase voltage and the switch erase voltage have the same value, the bias voltage on the dummy word line is set to be higher than the bias voltage on the core word line, and thus realizing a light erase.

Other implementations can be used to make the effective switch erase voltage lower than the first effective erase voltage.

Figure 10:
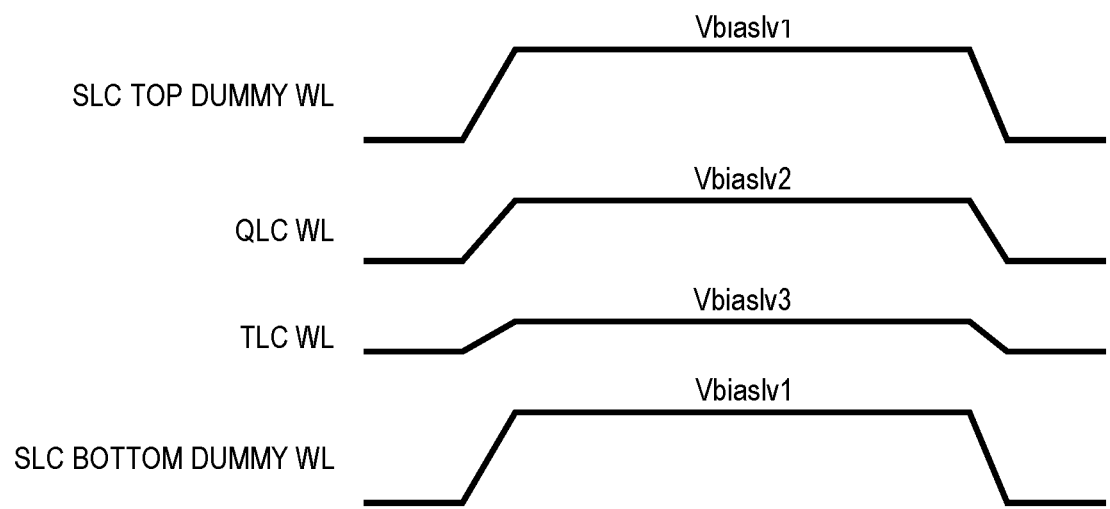
FIG. 10 illustrates waveform diagrams of different bias voltage values and erase voltage values of erase and switch erase operations, according to some aspects of the present disclosure.

In some implementations, the memory system can apply different switch bias voltage values to different word lines of the block. FIG. 10 illustrates waveform diagrams of different bias voltage values and erase voltage values of erase and switch erase operations, according to some aspects of the present disclosure. As illustrated, the memory system can apply a first switch bias voltage ("Vbias1v1") on a dummy word line (either on an upper or a lower half) of a block in a SLC mode, and can apply a second switch bias voltage ("Vbias1v2") on a core word line in the block. The first switch bias voltage ("Vbias1v1") applied on the dummy word line is higher than the second switch bias voltage ("Vbias1v2") applied on the core word line. The switch bias voltages applied on a QLC core word line ("Vbias1v2") may be the same as or different from (e.g., higher than) the switch bias voltages applied on a TLC core word line ("Vbias1v3"), and both are lower than the first switch bias voltage ("Vbias1v1") on a dummy word line in the block.

In addition, in some implementations, the switch bias voltages applied on different dummy word lines in the block may have different values. In some implementations, the switch bias voltages applied on a dummy word line in the upper half of a block is higher than the switch bias voltages applied on a dummy word line in the lower half of the block.

Figure 11:
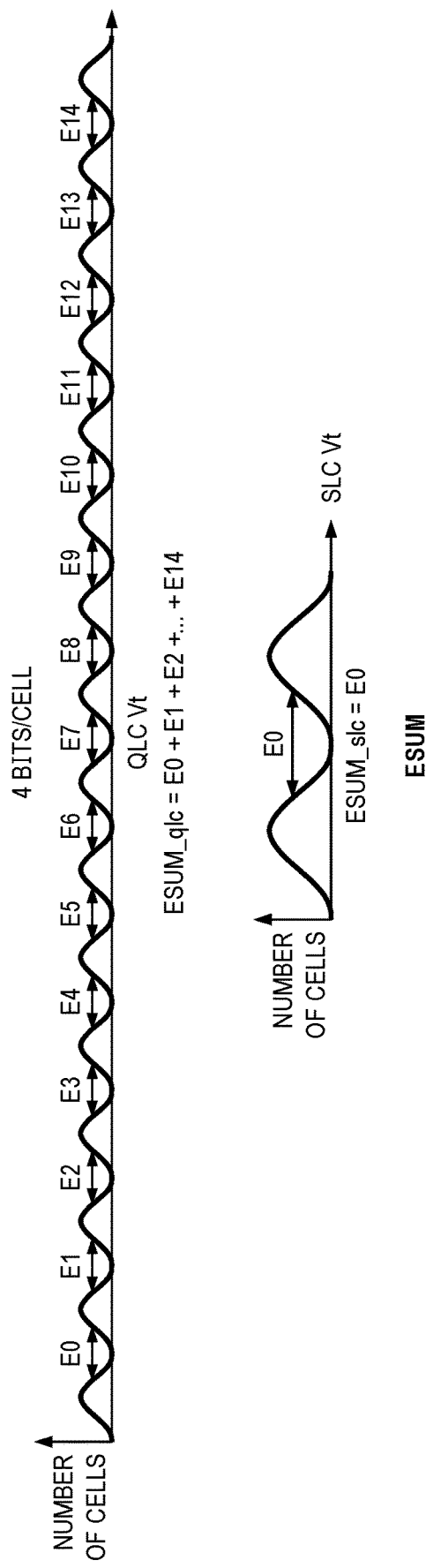
FIG. 11 illustrates example threshold voltage distributions of memory cells in QLC and SLC modes, respectively, according to some aspects of the present disclosure.

FIG. 11 illustrates example threshold voltage distributions of memory cells in QLC and SLC modes, respectively, according to some aspects of the present disclosure. On the top half of FIG. 11, a first threshold voltage distribution of the portion of the memory cells (e.g., prior to applying the switch erase voltage to the portion of the memory array) is shown. The portion of the memory cells is in the QLC mode that includes sixteen voltage states. The sum of the intervals between the sixteen voltage states is ESUM (sum of voltage state intervals). The first threshold voltage distribution includes the distribution of the sixteen voltage states and the corresponding ESUM characteristics of the sixteen voltage states. In some implementations, in order to ensure that the memory device meets the reliability requirement, it is desirable to keep each of the sixteen voltage states in a small range, and further ensure that the sum of the sixteen voltage distribution intervals is large enough, that is, ensure that the ESUM is large enough to distinguish the sixteen voltage states. FIG. 11 illustrates the example where the portion of the memory cells is in the QLC mode that includes sixteen voltage states, but more generally, the portion of the memory cells can be in a MLC mode that includes four or more voltage states.

On the bottom half of FIG. 11, a second threshold voltage distribution of the portion of the memory cells (e.g., after applying the switch erase voltage to the portion of the memory array) is shown. The portion of the memory cells is in the SLC mode that includes two voltage states. The second threshold voltage distribution includes the distribution of the two voltage states and the corresponding ESUM characteristics of the two voltage states. In some implementations, in order to ensure that the memory device meets the reliability requirement, it is desirable to keep the threshold voltage distribution in a switched SLC mode (including the two voltage states and the ESUM (sum of a voltage state interval) of the two voltage states) similar to the threshold voltage distribution in the regular SLC mode. In some implementations, by performing the switch erase operation on the portion of the memory cells, the threshold voltage distribution of the switched SLC mode is more similar to the threshold voltage distribution of a regular SLC mode, compared to a threshold voltage distribution that would have been achieved if a regular QLC erase operation were performed. In some implementations, the erase depth or level of the switch erase operation is lighter than the erase depth or level of the regular QLC erase operation. Accordingly, a threshold voltage of a memory cell of the portion of the memory array after performing the switch erase operation will be higher than a threshold voltage of the memory cell of the portion of the memory array after performing the regular QLC erase operation, realizing a lighter erase. For example, a threshold voltage of a memory cell of the portion of the memory array after performing the switch erase operation can be −1v, whereas the a threshold voltage of a memory cell of the portion of the memory array after performing the regular QLC erase operation can be −2v.

In some implementations, a value of the effective switch erase voltage is generally configured to approach or mimic an erased state of the second storage mode with the second threshold voltage distribution. Thus the effective switch erase voltage allows for more efficiently change of the threshold voltages of the memory cells to the desired erased state of the second storage mode. The second storage mode facilitates program operations to be performed later on the portion of memory cells according to the second storage mode.

Figure 12:
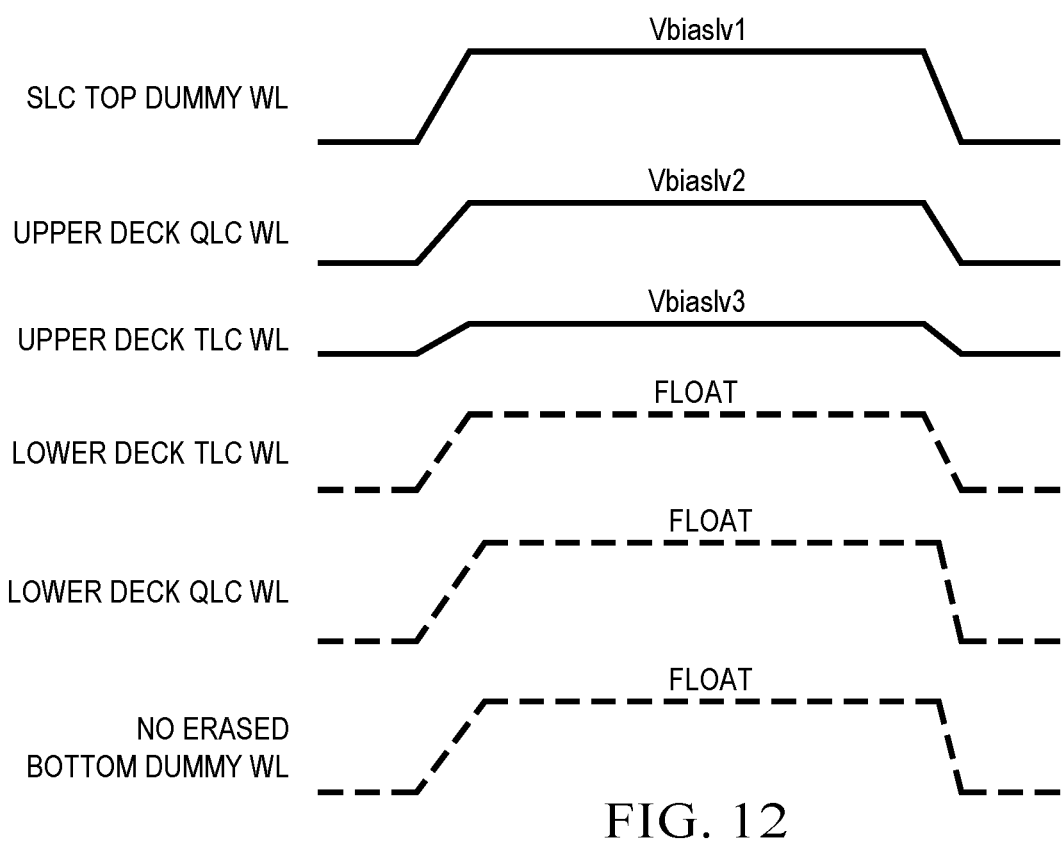
FIG. 12 illustrates example waveform diagrams of different bias voltage values and erase voltage values of erase and switch erase operations that are performed on part of a block (e.g., a half block), according to some aspects of the present disclosure.

FIG. 12 illustrates example waveform diagrams of different bias voltage values and erase voltage values of erase and switch erase operations that are perform on part of a block (e.g., a half block), according to some aspects of the present disclosure. In the example of FIG. 12, the half block is the upper half of the pages that make up the block, although in other examples, the half block could alternatively be the lower half of the pages that make up the block. As illustrated, the memory system can apply a first switch bias voltage ("Vbias1v1") on a dummy word line in the upper half of the block in a SLC mode, apply a second switch bias voltage ("Vbias1v2") on a core word line in the upper half of the block in a QLC mode (referred to a "QLC WL"), and apply a third switch bias voltage ("Vbias1v3") on a core word line in the upper half of the block in a TLC mode (referred to a "TLC WL"). The first switch bias voltage ("Vbias1v1") applied on the top dummy word line is higher than the second switch bias voltage ("Vbias1v2") applied on the core QLC word line, which is in turn higher than the third switch bias voltage ("Vbias1v3") applied on the core TLC word line. In the meantime, the word lines of the non-selected lower half of the block, including a dummy word, a core QLC word line, and a core TLC word line, in the lower half of the block are left to float.

Referring back to FIG. 4, in some implementations, the erase operation can be a GIDL erase operation. Different from the P-well erase operation that applies an erase voltage to a P-well, under the GIDL erase operation, for the first erase operation (that corresponds to the first storage mode), the memory system applies the first effective erase voltage of the first erase operation (that corresponds to the first storage mode) by applying a first bias voltage ("vbiaslv") to a word line of a selected block, and a first erase voltage to a source line and/or a bit line of the selected block. By contrast, for the switch erase operation, in some implementations, the memory system applies the effective switch erase voltage by applying a switch bias voltage to the word line of the selected block, and a switch erase voltage to the source line and/or the bit line of the selected block.

Similar to P-well erase operations, in some of these implementations, although the first bias voltage and the switch bias voltage may have the same value, the switch erase voltage value will be lower than the first erase voltage value. When a lower switch erase voltage is applied to the source line and/or the bit line of the selected block, its effective erase voltage is correspondingly reduced, thus reducing the erase stress on the memory cell of the selected block. In others of these implementations, although the first erase voltage and the switch erase voltage may have the same value, the switch bias voltage value will be higher than the first bias voltage value. When a higher switch bias voltage is applied to the word line of the selected block, its effective erase voltage is effectively reduced, thus similarly reducing the erase stress on the memory cell of the selected block. In these implementations, the voltages applied on the word lines and dummy word lines may be similar to those applied in the P-well erase operation, as discussed above. Similarly, other implementations can be used to make the effective switch erase voltage lower than the first effective erase voltage.

Figure 13:
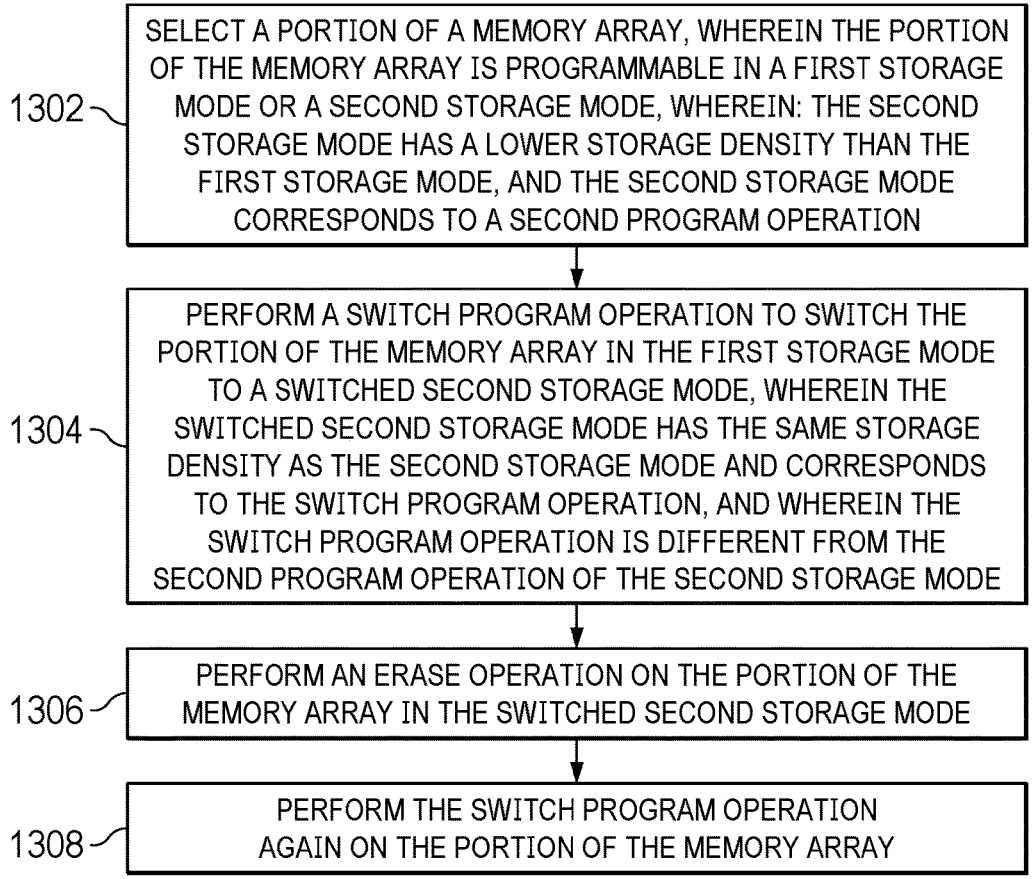
FIG. 13 illustrates a flowchart of an example process for performing switch program operations, according to some aspects of the present disclosure.

FIG. 13 illustrates a flowchart of an example process 1300 for performing switch program operations, according to some aspects of the present disclosure. The process 1300 can be implemented by one or more computer programs installed on one or more computers in one or more locations and programmed in accordance with this disclosure. For example, the process 1300 can be performed by the memory device shown in FIG. 1. For convenience, the process 1300 will be described as being performed by a memory system including a memory device (e.g., memory device 100). The memory device includes a memory cell array and peripheral circuits (e.g., memory cell array 101 and peripheral circuits 102). The peripheral circuits include the control logic of the memory device. In some implementations, some or all of the operations in the example process 1300 can be implemented based on the techniques described in connection with FIGS. 1-3 and 14-24. The operations shown in process 1300 may not be exhaustive and that other operations can be performed as well before, after, or between any of the illustrated operations. Further, some of the operations may be performed simultaneously, or in a different order than shown in FIG. 13.

The memory system selects a portion of a memory cell array (1302), for example, to perform a switch program operation. In some implementations, this selection may be due to some control signals and/or commands issued by the control logic in the peripheral circuits and/or a memory controller of the memory device. In some implementations, this selection may be due to an above threshold number of unrecoverable read errors or some number of read retries for a read of data from the memory device. In some implementations, this selection may be due to some other indication of unreliability or wear in the memory device. In general the memory system can select any portion of the memory cell array to perform the switch program operation. For example, the memory system can select any word line in a block of memory cells included in the memory array. For example, the memory system can select either a dummy word line or a core word line (e.g., a QLC word line, a TLC word line, etc.).

The portion of the memory array is programmable in a first storage mode or a second storage mode, where the second storage mode has a lower storage density than the first storage mode. For example, the first storage mode can be a QLC mode, where the memory cells store two bits of data per cell, while the second storage mode can be a SLC mode, where the memory cells store one single bit of data per cell. More generally, the first storage mode can be a MLC mode, where the memory cell stores two, three, four, or more bits of data per cell. Each storage mode corresponds to a respective program operation and crease operation. For example, the first storage mode corresponds to a first program operation that uses a first program voltage value, and the second storage mode corresponds to a second program operation that uses a second program voltage value. The first and the second program operations differ in at least a voltage value of a program voltage pulse, i.e., the magnitude of a program voltage pulse.

Figure 14:
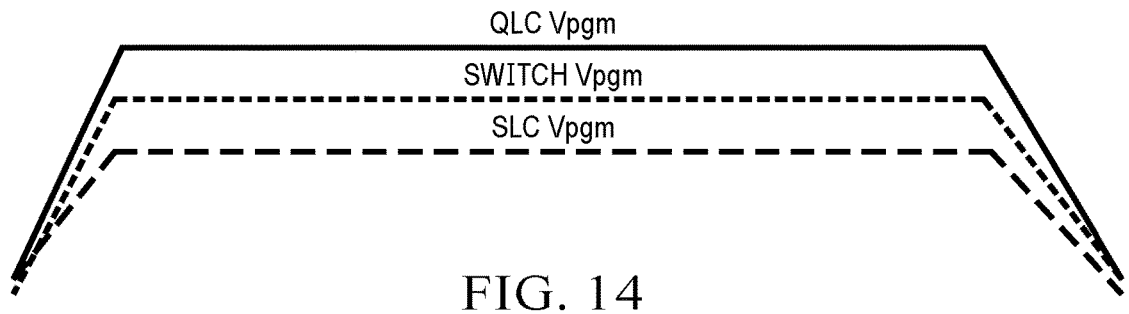
FIG. 14 illustrates a waveform diagram of different program operations in different storage modes, according to some aspects of the present disclosure.

FIG. 14 illustrates a waveform diagram of different program operations in different storage modes, according to some aspects of the present disclosure. As illustrated in FIG. 14, a program operation that corresponds to a QLC mode can use a program voltage pulse having the higher voltage value ("QLC Vpgm"), while a program operation that corresponds to a SLC mode can use a program voltage having the lower voltage value ("SLC Vpgm").

The memory system performs a switch program operation to switch the portion of the memory array from the first storage mode to a switched second storage mode (1304). The switched second storage mode has the same storage density as the second storage mode but may require different program operation and/or erase operation in the switched second storage mode. For example, in the case where the second storage mode is a SLC mode, the switched second storage mode is a switched SLC mode. Similar to the regular SLC mode, the switched SLC mode stores only one bit of data per cell. However, the program operation in the switched SLC mode may have a different voltage than the one in the regular SLC mode, while the erase operation in the switched SLC mode may have the same voltage as the one in the regular SLC mode. In other words, following the switch program operation, the memory system will continue access and erase the selected portion of the memory array as if they were in the second storage mode (despite the fact they were in the first storage mode with higher storage density at step 1302) by storing only one bit of data per cell using erase operation and program operation corresponding to the switched SLC mode, rather than blindly reusing the same erase operation and program operation corresponding to the regular SLC mode.

In some implementations, the switch program operation is different from both the regular program operation that corresponds to the first storage mode (e.g., QLC mode) and the regular program operation that corresponds to the second storage mode (e.g., SLC mode). That is, in order to be accessed and erased as if they were in the second storage mode instead of in the first storage mode, the selected portion of the memory array is programmed by a switch program operation that is different from both the program operation that corresponds to the first and the program operation that corresponds to the second storage mode. In cases where the selected portion of the memory array is on a dummy word line, the switch program operation can use a switch program voltage value that is higher than the second program voltage value, and in some implementations, the switch program voltage value is also lower than the first program voltage.

As illustrated in FIG. 14, the switch program operation can use a program voltage pulse having a voltage value ("switch Vpgm") that is lower than the QLC program voltage value ("QLC Vpgm") but higher than the SLC program voltage value ("SLC Vpgm"). Although FIG. 14 illustrates the three voltage pulses as having different pulse lengths, i.e., as having different durations, this is not required. In fact, in some implementations, two or more of the three program voltage pulses can have the same duration.

In some cases, the memory system performs an erase operation on the portion of the memory array in the switched second storage mode (1306). The erase operation can be the same as the regular erase operation that would be performed by the memory system on any portion of the memory array in the second storage mode (e.g., SLC mode). In other words, once the memory system has performed steps 1302-1304 to switch the portion of the memory array from the first storage mode into the switched second storage mode, the memory system can continue to access and erase the portion of the memory array as if it were in the second storage mode by using regular erase operations that correspond to the second storage mode.

In some cases, the memory system performs the switch program operation again on the portion of the memory array in the switched second storage mode (1308). The switch program operation can be the same as, and in particular can use the same switch program voltage value as, the switch program operation performed in step 1304. Unlike erase operations which could the same as regular erase operations that correspond to the second storage mode, once switched into the switched second storage mode, the program operation to be performed on the portion of the memory array will generally be different from the regular, second program operations that correspond to the regular second storage mode.

Figure 15:
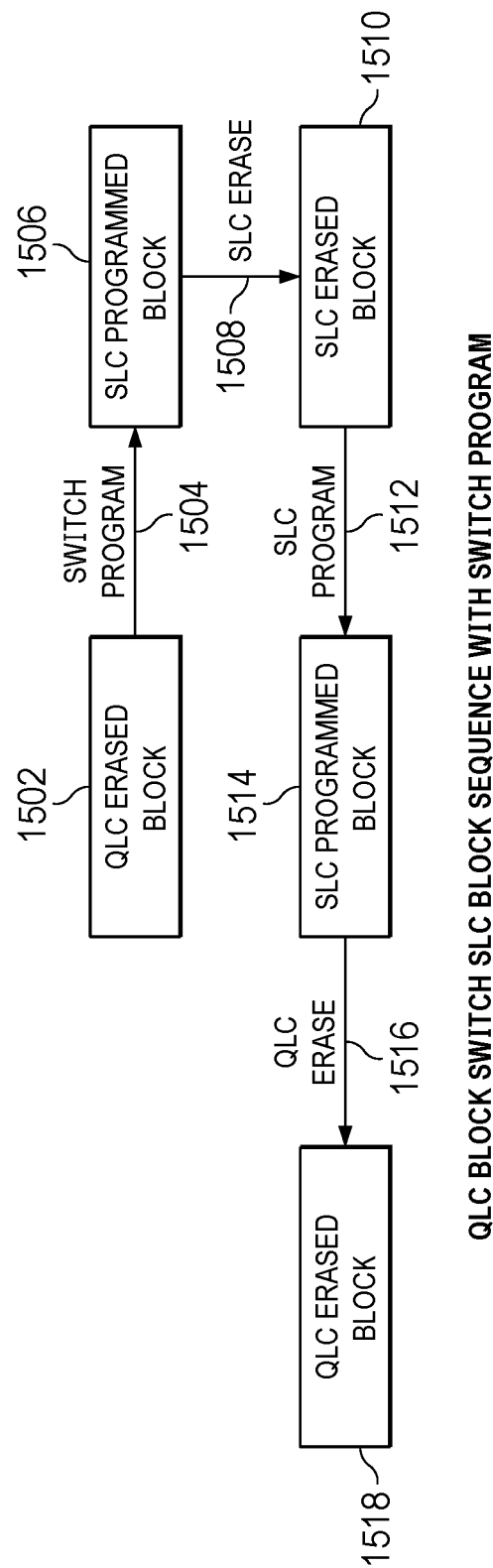
FIG. 15 illustrates an example process of performing the switch program operations according to FIG. 13 on a block of a memory device, according to some aspects of the present disclosure.

FIG. 15 illustrates an example process of performing the switch program operations according to FIG. 13 on a block of a memory device, according to some aspects of the present disclosure. The block can include one or more pages of memory cells. The switch program operations can be performed on any page in the block. At 1502, the block begins with being erased in a QLC mode. At 1504, a switch program operation is performed on the block to program a selected page in the block and enter a SLC programmed state that approaches or mimics a programmed state of a regular SLC mode, which prepares the block to be erased according to the SLC mode later. As similarly discussed above, performing the switch program operation includes using a specifically designed switch program voltage (e.g., switch Vpgm) to avoid under-programming the memory cell.

Following the switch program operation, at 1506, the selected page in the block is programmed and is in the SLC programmed state (referred to as a SLC programmed block) with characteristics (e.g., including threshold voltage and ESUM characteristics) that are similar to the programmed state in the regular SLC mode. Further, the block is now switched from the QLC mode to a switched SLC mode, resulting in a lower storage density of the memory cells in the block than the QLC mode. At 1508, an SLC erase operation is performed on the block. The SLC erase operation can use a default erase voltage value of a regular erase operation that corresponds to the SLC mode in the memory device. Following the SLC erase operation, at 1510, the block is erased according to the SLC mode. The block is (being treated as if it were) in the SLC mode. At 1512, a SLC program operation (and rather than the switch erase operation) that corresponds to the SLC mode in the memory device is performed to program a selected page in the block. Here the selected page in the block can be the same or different from the page in the block programmed at 1506 by using the switch program operation. Following the SLC program operation, at 1514, the selected page in block is programmed. Further, the block is now switched from the QLC mode to the SLC mode. At 1516, a QLC erase operation is performed on the block. The QLC erase operation can use an erase voltage value of a regular erase operation that corresponds to the QLC mode in the memory device. Following the QLC erase operation, at 1518, the block is erased. The block continues to be in the QLC mode.

Figure 16:
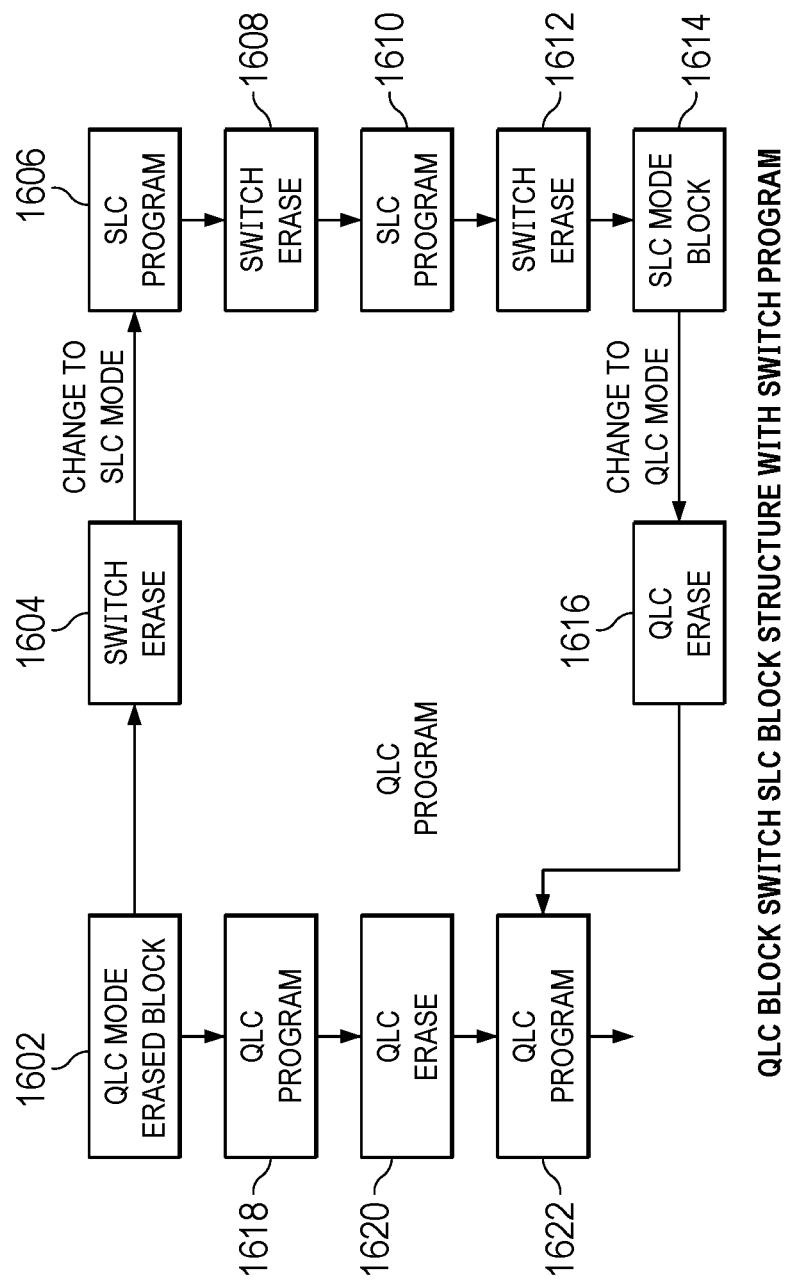
FIG. 16 illustrates another example technique of performing the switch program operations according to FIG. 13 on a block of a memory device, according to some aspects of the present disclosure.

FIG. 16 illustrates another example technique of performing the switch program operations according to FIG. 13 on a block of a memory device, according to some aspects of the present disclosure. The block can include one or more pages of memory cells. The switch program operations can be performed on any page in the block. At 1602, the block begins with being erased in a QLC mode (referred to as a "QLC erased block" or in a "QLC erased state"). At 1604, a switch program operation is performed on a selected page in the block to program the selected page in the block as well as to facilitate the switch of the block from the QLC mode to a switched SLC mode. From 1604 and going forward until 1616, the block can now be accessed and erased as if it were in the SLC mode. Specifically, at 1606, an SLC erase operation is performed to erase the block. The SLC erase operation can use an erase voltage value of a regular erase operation that corresponds to the SLC mode in the memory device. At 1608, a switch program operation is performed to program the selected page in the block which was erased by using the SLC erase operation performed at 1616. At 1610 and 1612, another iteration of SLC erase and switch program operations can be performed. At 1614, the block, which has been programmed, is (being treated as if it were) in the SLC mode. To erase the block and, in particular, to switch the mode of the block from the SLC mode back to the QLC mode, at 1616, a regular QLC erase operation that corresponds to the QLC mode in the memory device is performed.

Turning back to 1602 where the block begins with being erased in the QLC mode, at 1618, assuming that a regular QLC program operation is performed on the selected page in the block, then the block will remain in the QLC mode having the selected page in the block programmed. At 1620, a regular QLC erase operation is performed to erase the block according to the regular QLC mode. The QLC erase operation can use an erase voltage value of a regular erase operation that corresponds to the QLC mode in the memory device. In other words, following both 1616 and 1620, the block will become an erased block in QLC mode. Thus, at 1622, a QLC program operation can be performed on a selected page in the block to program the block. The QLC program operation can use the program voltage value of the regular program operation that corresponds to the QLC mode in the memory device.

Figure 17:
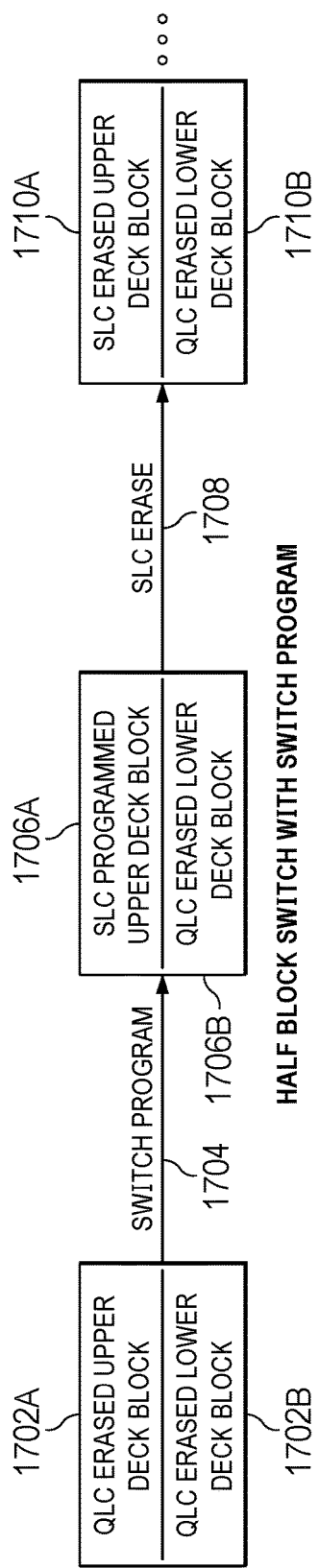
FIG. 17 illustrates an example technique of performing the switch program operations according to FIG. 13 on a half block of a memory device, according to some aspects of the present disclosure.

FIG. 17 illustrates an example technique of performing the switch program operations according to FIG. 13 on a half block of a memory device, according to some aspects of the present disclosure. The half block can include half of the memory cells of a block of the memory device. In the example of FIG. 17, the half block is the upper half of the block, and the switch program operations can be performed on any page in the upper half block, although in other examples, the half block could alternatively be the lower half of the block, or in another location within the block. At 1702A and 1702B, the block including both its upper and lower halves begins with being erased in a QLC erased mode. At 1704, a switch program operation is performed on the upper half block to perform a selected page in the upper half block. Following the switch program operation, at 1706A, the page in the upper half block is programmed and is now in the SLC mode. By contrast, at 1706B, the lower half block is still erased in the QLC mode (unchanged from 1702B). At 1708, a SLC erase operation is performed on the upper half block to erase the upper half block. The SLC erase operation can use a program voltage value of a regular erase operation that corresponds to the SLC mode in the memory device. Following the SLC erase operation, at 1710A, the upper half block, which is (being treated as if it were) in the SLC mode, is now erased. At 1710B, the lower half block remains erased in the QLC mode (unchanged from 1702B).

Figure 18:
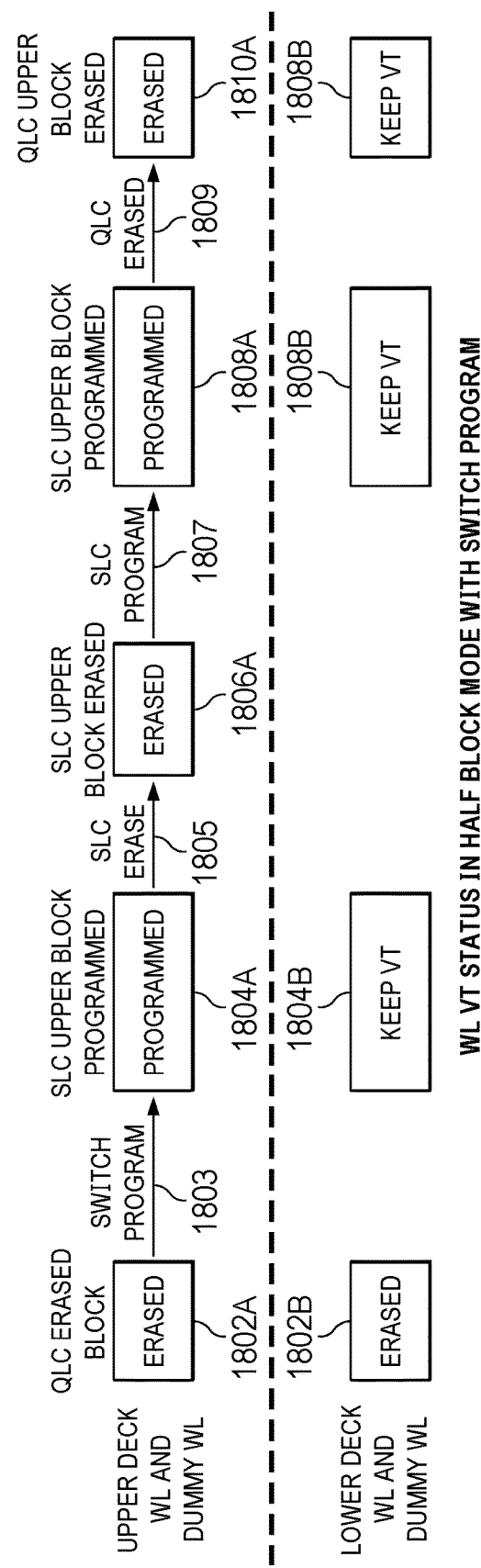
FIG. 18 illustrates another example technique of performing the switch program operations according to FIG. 13 on a half block, according to some aspects of the present disclosure.

FIG. 18 illustrates another example technique of performing the switch program operations according to FIG. 13 on a half block, according to some aspects of the present disclosure. The half block can include half of the memory cells of a block of the memory device. In the example of FIG. 18, the half block is the upper half of the block, and the switch program operations can be performed on any page in the upper half block, although in other examples, the half block could alternatively be the lower half of the block, or in another location within the block.

At 1802A and 1802B, the block including both its upper and lower halves begins with being erased in a QLC erased mode. At 1803, a switch program operation is performed on the upper half block to program a selected word line in the upper half block. Following the switch program operation, at 1804A, the selected word line in upper half block is programmed and the upper half block is now in the SLC mode. At 1805, a SLC erase operation is performed on the upper half block to erase the upper half block. Following the SLC erase operation, at 1806A, the upper half block, which is (being treated as if it were) in the SLC mode, is now erased according to the SLC mode. At 1807, a SLC program operation is performed on a selected page in the upper half block to program the selected page in the upper half block. Following the SLC program operation, at 1808A, the selected page in the upper half block is programmed. Further, because the regular SLC program operation instead of the switch program operation was performed, the upper half block is switched back to the QLC mode from the SLC mode. At 1809, a QLC erase operation is performed on the upper half block, which is in the QLC mode, to erase the upper half block. Following the QLC erase operation, at 1810A, the upper half block is erased and is in the QLC mode.

By contrast, the lower half block is not affected by the operations at 1803, 1805, 1807, and 1809 and thus remains erased in the QLC mode from 1804A, 1806B, 1808B, to 1810B (unchanged from 1802B). Accordingly, the threshold voltage distribution of the lower half block remains unchanged.

Referring back to FIG. 13, in some implementations, each program operation uses a single program voltage pulse while in some other implementations, each program operation can use a sequence of multiple program voltage pulses. The sequence of program voltage pulses may have increasing values, starting with an initial pulse having an initial program voltage value. Thus, if a sequence of multiple program voltage pulses are used, the switch program operation can differ from the first and second program operations in the first and second modes at least in their respective initial voltage values of initial program voltage pulses in the sequence.

To program (or write data to) targeted memory cells, a program voltage (Vpgm) can be applied to one or more selected word lines that include the targeted memory cells, and thus, to a control gate of each memory cell coupled to the selected word lines. Whereas the program voltage is applied to the selected word lines, a potential, such as a ground potential (e.g., Vss), can be applied to the bit lines and substrates (and thus the channels, between the sources and drains) of the memory cells targeted for programming, resulting in a charge transfer from the channels to the floating gates of the targeted memory cells. Similar to the effective erase voltage discussed above, an effective program voltage is the difference between the program voltage and the potential voltage.

In the meantime, a pass voltage (Vpass) can be applied to one or more unselected word lines having memory cells that are not targeted for programming, or an inhibit voltage (e.g., Vcc) can be applied to bit lines having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

Figure 19:
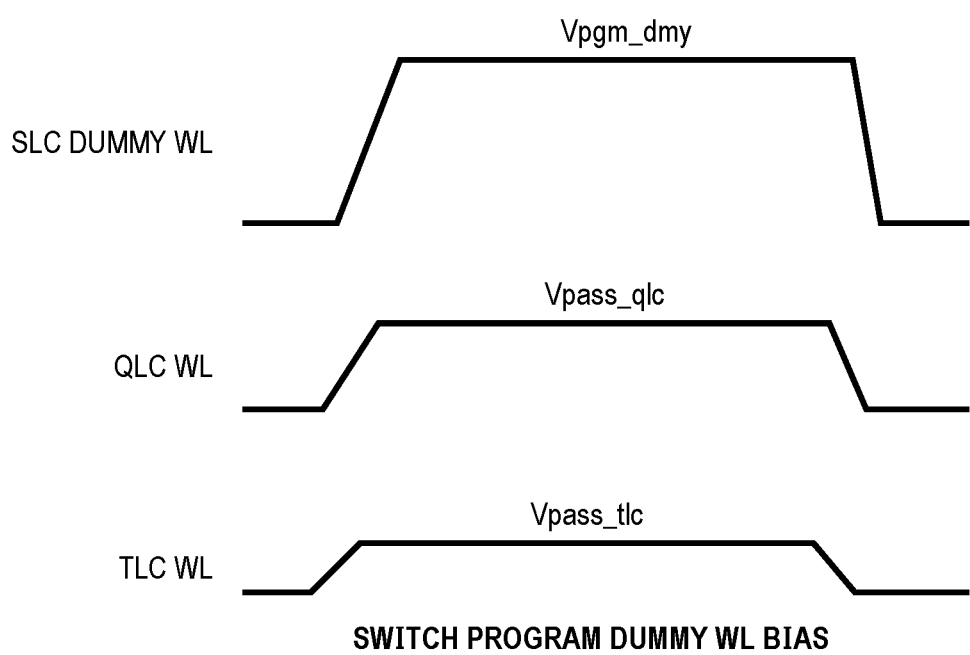
FIG. 19 illustrates additional waveform diagrams of different program and pass voltages of the switch program operations in FIG. 13, according to some aspects of the present disclosure.

FIG. 19 illustrates additional waveform diagrams of different program and pass voltages of the switch program operations in FIG. 13, according to some aspects of the present disclosure. In the example of FIG. 19, the targeted memory cells are in a SLC mode; the targeted memory cells are on a selected, dummy word line in a block in the memory device. As illustrated, the memory system can apply a switch program voltage ("Vpgm_dmy") on the selected dummy word line, apply a pass voltage ("Vpass_qlc") on an unselected core QLC word line, and apply a pass voltage ("Vpass_tlc") on an unselected core TLC word line. As illustrated in this example, the switch program voltage ("Vpgm_dmy") applied on the selected dummy word line is higher than the pass voltage ("Vpass_qlc") applied on the unselected core QLC word line, which is in turn higher than the pass voltage ("Vpass_tlc") applied on the unselected core TLC word line.

Figure 20:
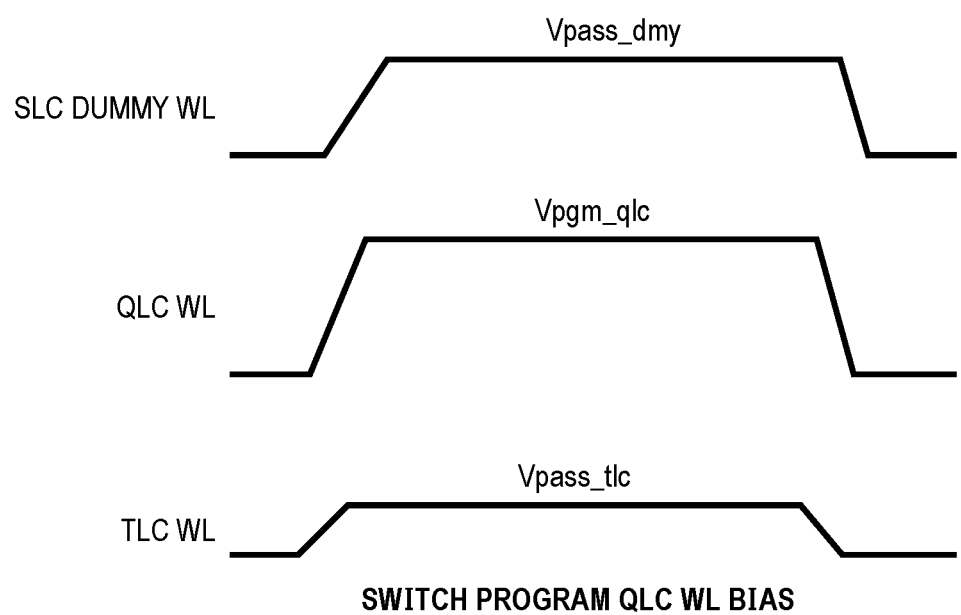
FIG. 20 illustrates additional waveform diagrams of different program and pass voltages of the switch program operations in FIG. 13, according to some aspects of the present disclosure.

FIG. 20 illustrates additional waveform diagrams of different program and pass voltages of the switch program operations in FIG. 13, according to some aspects of the present disclosure. In the example of FIG. 20, the targeted memory cells are in a QLC mode; the targeted memory cells are on a selected, core word line in a block in the memory device. As illustrated, the memory system can apply a switch program voltage ("Vpgm_qlc") on the selected core word line, apply a pass voltage ("Vpass_dmy") on an unselected dummy word line, and apply a pass voltage ("Vpass_tlc") on an unselected core TLC word line. As illustrated in this example, the switch program voltage ("Vpgm_qlc") applied on the selected core word line is higher than the pass voltage ("Vpass_dmy") applied on the unselected dummy SLC word line, which is in turn higher than the pass voltage ("Vpass_tlc") applied on the unselected core TLC word line.

Figure 21:
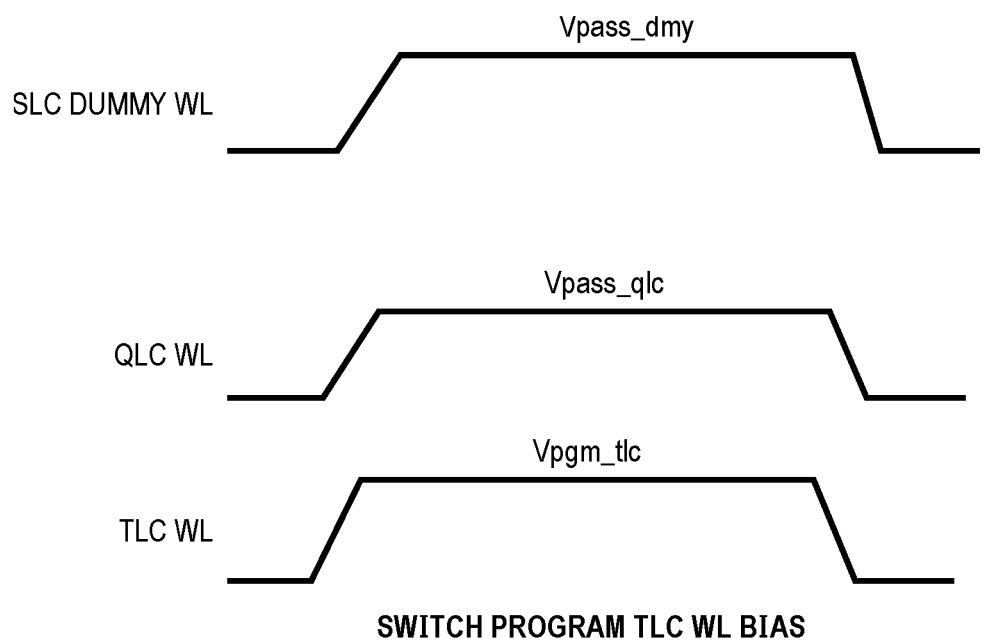
FIG. 21 illustrates additional waveform diagrams of different program and pass voltages of the switch program operations in FIG. 13, according to some aspects of the present disclosure.

FIG. 21 illustrates additional waveform diagrams of different program and pass voltages of the switch program operations in FIG. 13, according to some aspects of the present disclosure. In the example of FIG. 21, the targeted memory cells are in a TLC mode; the targeted memory cells are on a selected, core word line in a block in the memory device. As illustrated, the memory system can apply a switch program voltage ("Vpgm_tlc") on the selected core word line, apply a pass voltage ("Vpass_dmy") on an unselected dummy word line, and apply a pass voltage ("Vpass_qlc") on an unselected core QLC word line. As illustrated in this example, the switch program voltage ("Vpgm_tlc") applied on the selected core word line is higher than the pass voltage ("Vpass_dmy") applied on the unselected dummy word line, which is in turn higher than the pass voltage ("Vpass_qlc") applied on the unselected core QLC word line. In typical implementations, a switch program voltage applied to a selected dummy word line ("Vpgm_dmy") has a lower value than a switch program voltage ("Vpgm_qlc" or "Vpgm_tlc") applied to a selected core word line.

Figure 22:
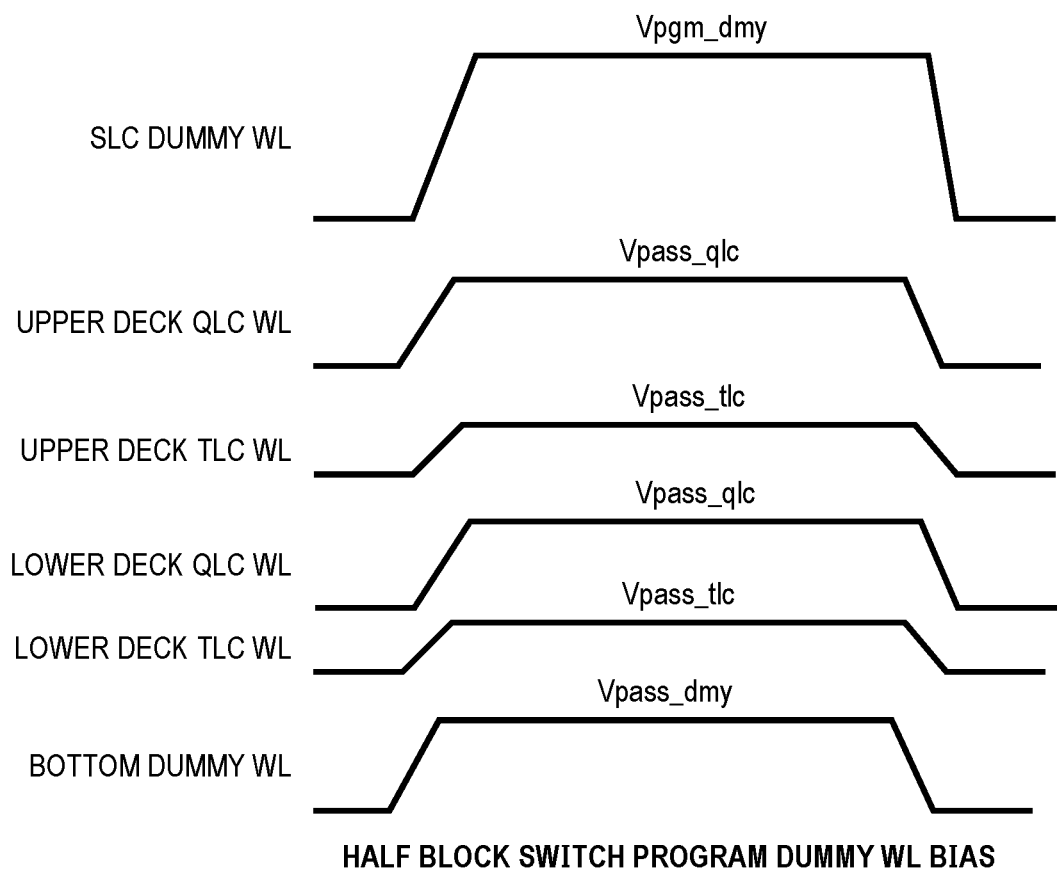
FIG. 22 illustrates additional waveform diagrams of different program and pass voltages of the switch program operations in FIG. 13, according to some aspects of the present disclosure.

FIG. 22 illustrates additional waveform diagrams of different program and pass voltages of the switch program operations in FIG. 13, according to some aspects of the present disclosure. In the example of FIG. 22, the targeted memory cells are in a SLC mode; the targeted memory cells are on a selected, dummy word line in an upper half block in the memory device. As illustrated, on the upper half block that includes the selected, dummy word line, the memory system can apply a switch program voltage ("Vpgm_dmy") on the selected dummy word line, apply a pass voltage ("Vpass_qlc") on an unselected core QLC word line, and apply a pass voltage ("Vpass_tlc") on an unselected core TLC word line . . . . As illustrated in this example, the switch program voltage ("Vpgm_dmy") applied on the selected dummy word line is higher than the pass voltage ("Vpass_qlc") applied on the unselected core QLC word line, which is in turn higher than the pass voltage ("Vpass_tlc") applied on the unselected core TLC word line. In addition, on the lower half block that does not include the selected, dummy word line, the memory system can apply a pass voltage ("Vpass_dmy") on an unselected dummy word line, apply a pass voltage ("Vpass_qlc") on an unselected core QLC word line, and apply a pass voltage ("Vpass_tlc") on an unselected core TLC word line. As illustrated in this example, the pass voltage ("Vpass_dmy") applied on the unselected dummy word line is higher than the pass voltage ("Vpass_qlc") applied on the unselected core QLC word line, which is in turn higher than the pass voltage ("Vpass_tlc") applied on the unselected core TLC word line.

Figure 23:
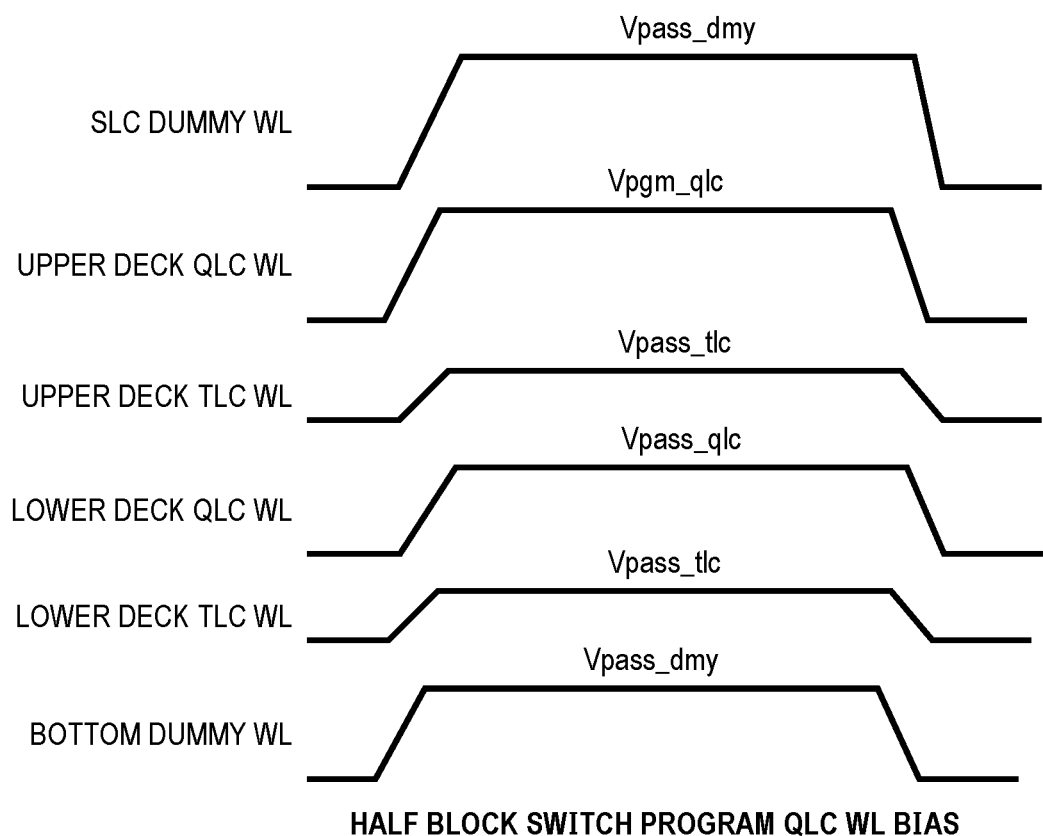
FIG. 23 illustrates additional waveform diagrams of different program and pass voltages of the switch program operations in FIG. 13, according to some aspects of the present disclosure.

FIG. 23 illustrates additional waveform diagrams of different program and pass voltages of the switch program operations in FIG. 13, according to some aspects of the present disclosure. In the example of FIG. 23, the targeted memory cells are in a QLC mode; the targeted memory cells are on a selected, core word line in an upper half block in the memory device. As illustrated, on the upper half block that includes the selected, core word line, the memory system can apply a switch program voltage ("Vpgm_qlc") on the selected core word line, apply a pass voltage ("Vpass_dmy") on an unselected dummy word line, and apply a pass voltage ("Vpass_tlc") on an unselected core TLC word line. As illustrated in this example, the pass voltage ("Vpass_dmy") applied on the unselected dummy word line is higher than the program voltage ("Vpgm_qlc") applied on the selected core QLC word line, which is in turn higher than the pass voltage ("Vpass_tlc") applied on the unselected core TLC word line. In addition, on the lower half block that does not include the selected, core word line, the memory system can apply a pass voltage ("Vpass_dmy") on an unselected dummy word line, apply a pass voltage ("Vpass_qlc") on an unselected core QLC word line, and apply a pass voltage ("Vpass_tlc") on an unselected core TLC word line. As illustrated in this example, the pass voltage ("Vpass_dmy") applied on the unselected dummy word line is higher than the pass voltage ("Vpass_qlc") applied on the unselected core QLC word line, which is in turn higher than the pass voltage ("Vpass_tlc") applied on the unselected core TLC word line.

Figure 24:
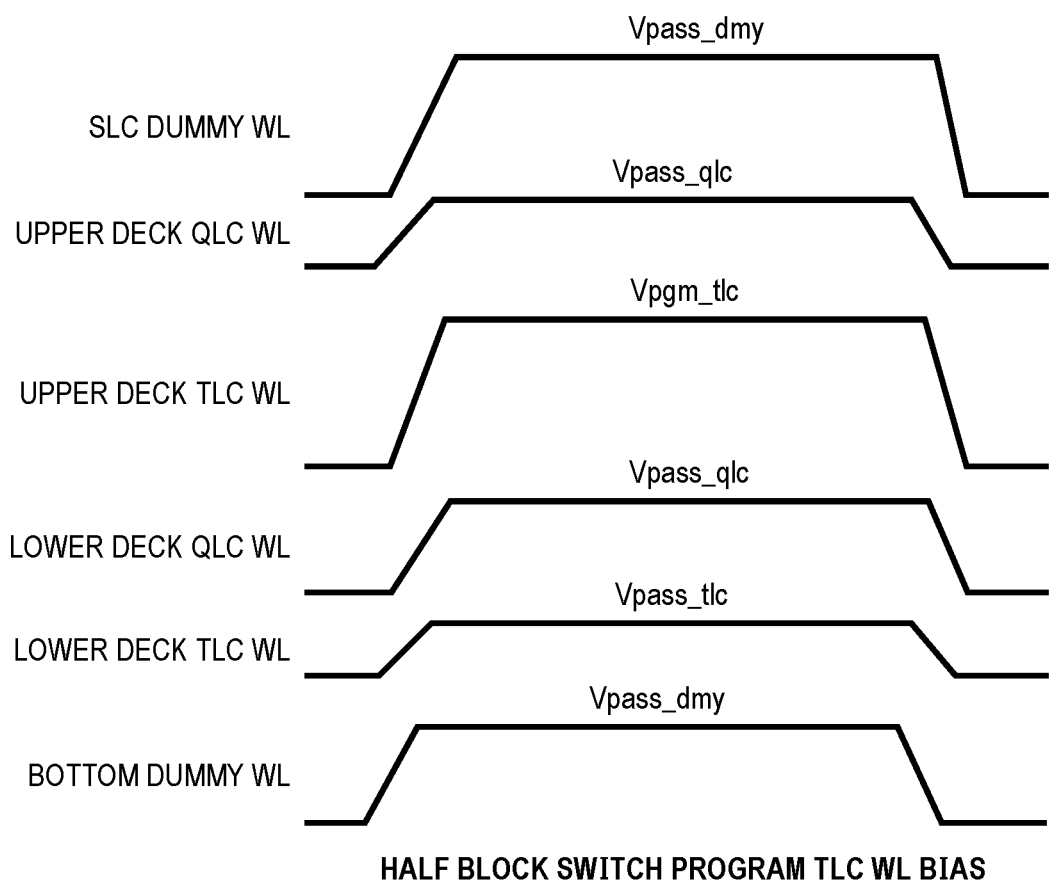
FIG. 24 illustrates further waveform diagrams of the different program and pass voltages of switch program operations in FIG. 13, according to some aspects of the present disclosure.

FIG. 24 illustrates further waveform diagrams of different program and pass voltages of the switch program operations in FIG. 13, according to some aspects of the present disclosure. In the example of FIG. 24, the targeted memory cells are in a TLC mode; the targeted memory cells are on a selected, core word line in an upper half block in the memory device. As illustrated, on the upper half block that includes the selected, core word line, the memory system can apply a switch program voltage ("Vpgm_tlc") on the selected core word line, apply a pass voltage ("Vpass_dmy") on an unselected dummy word line, and apply a pass voltage ("Vpass_qlc") on an unselected core QLC word line. As illustrated in this example, the switch program voltage ("Vpgm_tlc") applied on the selected core word line is higher than the pass voltage ("Vpass_dmy") applied on the unselected dummy word line, which is in turn higher than the pass voltage ("Vpass_tlc") applied on the unselected QLC word line. In addition, on the lower half block that does not include the selected, dummy word line, the memory system can apply a pass voltage ("Vpass_dmy") on an unselected dummy word line, apply a pass voltage ("Vpass_qlc") on an unselected core QLC word line, and apply a pass voltage ("Vpass_tlc") on an unselected core TLC word line. As illustrated in this example, the pass voltage ("Vpass_dmy") applied on the unselected dummy word line is higher than the pass voltage ("Vpass_qlc") applied on the unselected core QLC word line, which is in turn higher than the pass voltage ("Vpass_tlc") applied on the unselected core TLC word line.

Figure 25:
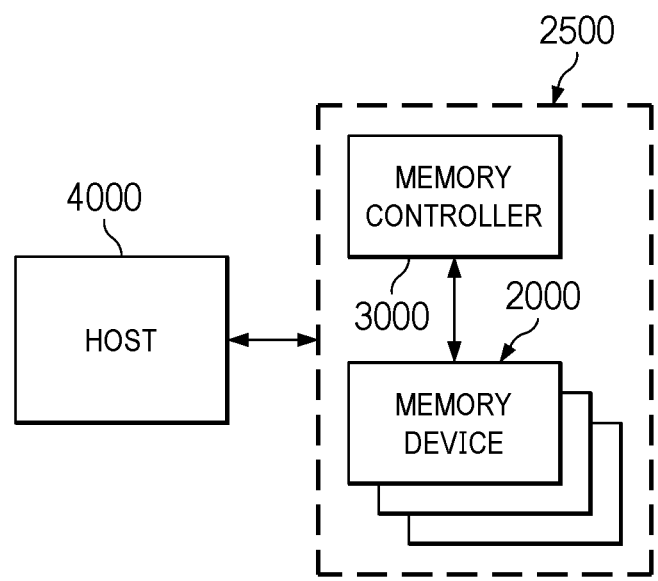
FIG. 25 illustrates a block diagram of an example system having a memory device, according to some aspects of the present disclosure.

FIG. 25 illustrates a block diagram of an example memory system having a memory device, according to some aspects of the present disclosure. The memory system 2500 includes one or more memory devices 2000 and a memory controller 3000. The one or more memory devices 2000 may operate in response to control of the memory controller 3000. The structure of the memory devices 2000 has been described in more detail above in FIGS. 2-3.

The memory device 2000 may receive commands, addresses, and data from the memory controller 3000. The memory device 2000 may perform an operation corresponding to a command on a region selected according to an address received from the memory controller 3000. For example, the memory device 2000 may perform a write operation (program operation), a read operation, and an erase operation. During a program operation, the memory device 2000 may program data into a region selected according to an address. During a read operation, the memory device 2000 may read data from an area selected according to an address. During an erase operation, the memory device 2000 may erase data stored in an area selected according to an address.

The memory controller 3000 is operable to control the operation of the memory device 2000. For example, the memory controller 3000 may control the operation of the memory device 2000 in response to a request received from the host 4000. Of course, the memory controller 3000 may, in some cases, also control the operation of the memory device 2000 without receiving a request from the host 4000.

For example, the memory controller 3000 may control the memory device 2000 to perform a program operation, a read operation, or an erase operation upon a request from the host 4000. During a programming operation, the memory controller 3000 may provide a program command, a physical address, and data to the memory device 2000. During a read operation, the memory controller 3000 may provide a read command and a physical address to the memory device 2000. During an erase operation, the memory controller 3000 may provide an erase command and a physical address to the memory device 2000.

In an example, the memory controller 3000 may generate and transfer a program command, an address, and data to the memory device 2000 without a request from the host 4000. For example, the memory controller 3000 may provide commands, addresses, and data to the memory device 2000 to perform background operations such as programming operations for wear leveling and programming operations for garbage collection.

The host 4000 may be a processor (e.g., a Central Processing Unit (CPU)) or a System on Chip (SoC) (e.g., an Application Processor (AP)) of the electronic device. Host 4000 may be communicatively coupled to memory system 2500.

The memory device 200 and the memory controller 3000 may be integrated into one semiconductor device. Illustratively, the memory device 2000 and the memory controller 3000 may be integrated into a single semiconductor device to form a memory card. Illustratively, the memory device 2000 and the memory controller 3000 may be integrated into a single semiconductor device to form a Solid State Drive (SSD). The SSD may include a memory system 2500 for storing data in the memory device 2000. When the memory system 2500 is used in an SSD, the operation rate of the host 4000 connected to the memory system 2500 can be significantly increased.

In an example, the memory system 2500 may be used as one of several elements of various electronic devices, such as: a computer, an ultra-mobile computer, a workstation, a netbook, a personal digital assistant, a portable computer, a network tablet, a wireless phone, a mobile phone, a smartphone, an electronic book, a portable multimedia player, a portable game console, a navigation system, a black box, a digital camera, a three-dimensional television, a digital audio recorder, a digital audio player, a digital picture recorder, a digital picture player, a digital video recorder, a digital video player, a wearable electronic device, a smart sensor, a virtual reality device, an augmented reality device, a device for transmitting/receiving information in a wireless environment, a device for a home network, a device for a computer network, a device for a telematics network, a Radio Frequency Identification (RFID) device, or other electronic device with a storage system, and the like.

Figure 26A:
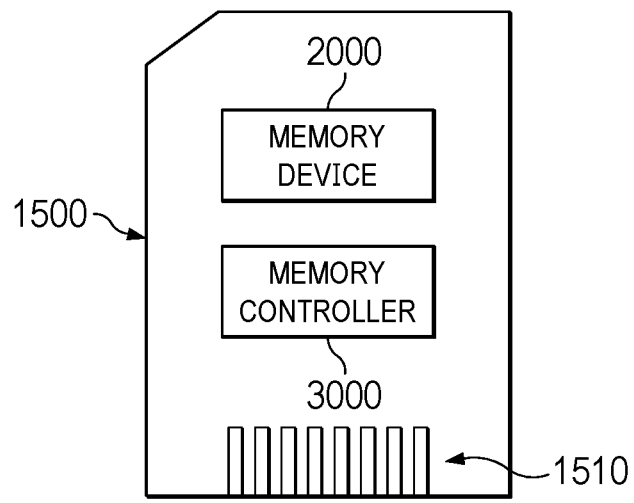
FIG. 26A illustrates a diagram of an example memory card having a memory device, according to some aspects of the present disclosure.

FIG. 26A illustrates a diagram of an example memory card having a memory device according to some aspects of the present disclosure. As shown in FIG. 26A, the memory controller 3000 and the single memory device 2000 may be integrated into a memory card 1500. The Memory Card 1500 includes, but is not limited to, a PC (Personal Computer Memory Card International Association, abbreviated as PC) Card, a CF (Compact Flash) Card, an SM (Smart Media) Card, a Memory stick, an MMC (Multi-Media Card, multimedia Card), an RS-MMC (Reduced-Size MMC, small multimedia Card), an MMCmicro (micro multimedia Card), an SD (Secure Digital Memory Card), a miniSD (small Secure Digital Memory Card), a microSD (micro Secure Digital Memory Card), an SDHC (Secure Digital High Capacity), a UFS (Universal Flash Memory) Card, and the like. The memory card 1500 may also include a memory card connector 1510 that couples the memory card 1500 with a host (e.g., host 4000 in FIG. 25).

Figure 26B:
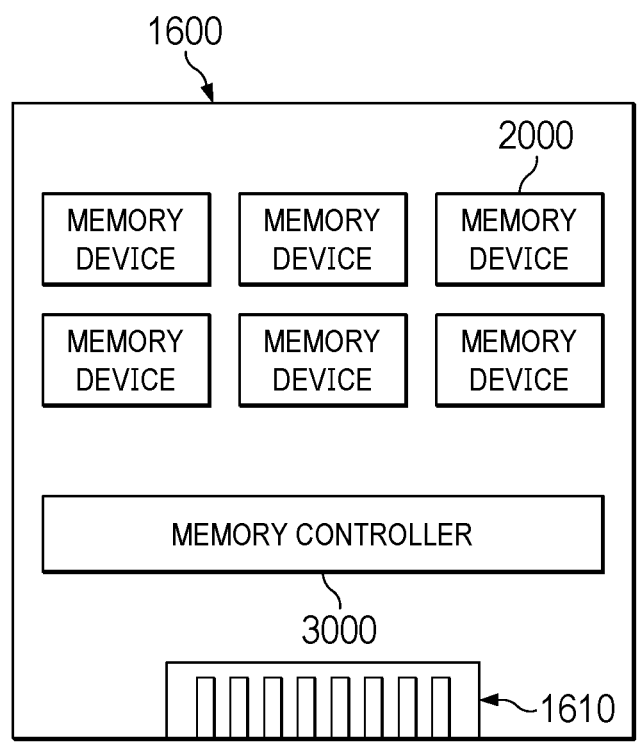
FIG. 26B illustrates a diagram of an example solid-state drive (SSD) having a memory device, according to some aspects of the present disclosure.

FIG. 26B illustrates a diagram of an example solid-state drive (SSD) having a memory device, according to some aspects of the present disclosure. As shown in FIG. 26B, the memory controller 3000 and the multiple memory devices 2000 may be integrated into the solid state drive 1600. Solid state drive 1600 may also include solid state drive connector 1610 coupling solid state drive 1600 with a host (e.g., host 4000 in FIG. 25). In some implementations, the storage capacity and/or operating speed of the solid state drive 1600 is greater than the storage capacity and/or operating speed of the memory card 1500.

Described examples of the subject matter can include one or more features, alone or in combination.

According to one aspect of the present disclosure, a method for operating a memory device is disclosed. The method comprises: selecting a portion of a memory array, wherein the portion of the memory array is programmable in a first storage mode or a second storage mode, wherein: the second storage mode has a lower storage density than the first storage mode, and the first storage mode corresponds to a first erase operation; and performing a switch erase operation to switch the portion of the memory array from the first storage mode to a switched second storage mode, wherein the switched second storage mode has the same storage density as the second storage mode and corresponds to the switch erase operation, and wherein the switch erase operation is different from the first erase operation on the memory array in the first storage mode.

According to another aspect of the present disclosure, a memory device is disclosed. The memory device includes a memory array; and a peripheral circuit coupled to the memory array and configured to perform operations comprising: selecting a portion of a memory array, wherein the portion of the memory array is programmable in a first storage mode or a second storage mode, wherein: the second storage mode has a lower storage density than the first storage mode, and the first storage mode corresponds to a first erase operation using a first effective erase voltage; and performing a switch erase operation to switch the portion of the memory array from the first storage mode to a switched second storage mode, wherein the switched second storage mode has the same storage density as the second storage mode and corresponds to the switch erase operation, and after performing the switch erase operation, a threshold voltage of a memory cell of the portion of the memory array is higher than a threshold voltage of the memory cell of the portion of the memory array after performing the first erase operation.

According to another aspect of the present disclosure, one or more non-transitory computer-readable storage media are disclosed. The one or more non-transitory computer-readable storage media store instructions that when executed by one or more machines cause the one or more machines to perform operations comprising: selecting a portion of a memory array, wherein the portion of the memory array is programmable in a first storage mode or a second storage mode, wherein: the second storage mode has a lower storage density than the first storage mode, and the first storage mode corresponds to a first erase operation; and performing a switch erase operation to switch the portion of the memory array from the first storage mode to a switched second storage mode, wherein the switched second storage mode has the same storage density as the second storage mode and corresponds to the switch erase operation, and after performing the switch erase operation, a threshold voltage of a memory cell of the portion of the memory array is higher than a threshold voltage of the memory cell of the portion of the memory array after performing the first erase operation.

According to another aspect of the present disclosure, a memory system is disclosed. The memory system comprises a controller; a memory device comprising a memory array; and a peripheral circuit coupled to the memory array and configured to perform operations comprising: selecting a portion of a memory array, wherein the portion of the memory array is programmable in a first storage mode or a second storage mode, wherein: the second storage mode has a lower storage density than the first storage mode, and the first storage mode corresponds to a first erase operation; and performing a switch erase operation to switch the portion of the memory array from the first storage mode to a switched second storage mode, wherein the switched second storage mode has the same storage density as the second storage mode and corresponds to the switch erase operation, and after performing the switch erase operation, a threshold voltage of a memory cell of the portion of the memory array is higher than a threshold voltage of the memory cell of the portion of the memory array after performing the first erase operation.

The foregoing and other described examples can each, optionally, include one or more of the following features:

In some implementations, the memory array comprises a three dimensional NAND array.

In some implementations, the switch erase operation is different in at least a voltage value than the first erase operation.

In some implementations, performing the first erase operation comprises applying a first effective erase voltage, and wherein performing the switch erase operation comprises applying an effective switch erase voltage that is lower than the first effective erase voltage.

In some implementations, performing the switch erase operation comprises performing the switch erase operation according to a P-well erase or a gate-induce-drain-leakage (GIDL) erase.

In some implementations, the first erase operation and the switch erase operation are performed according to a P-well erase operation. Applying the first effective erase voltage comprises applying a first bias voltage on a word line and applying a first erase voltage on a P-well, wherein applying the effective switch erase voltage comprises applying a switch bias voltage on the word line and applying a switch erase voltage on the P-well, and wherein the switch erase voltage is lower than the first erase voltage.

In some implementations, applying the switch bias voltage on the word line comprises: applying a first switch bias voltage on a dummy word line; and applying a second switch bias voltage on a core word line, wherein the first switch bias voltage applied on the dummy word line is higher than the second switch bias voltage applied on the core word line.

In some implementations, the first erase operation and the switch erase operation are performed according to a gate-induce-drain-leakage (GIDL) erase operation. Applying the first effective erase voltage comprises applying a first bias voltage on a word line and applying a first erase voltage on a source line and/or a bit line, wherein applying the effective switch erase voltage comprises applying a switch bias voltage on the word line and applying a switch erase voltage on the source line and/or the bit line, and wherein the switch bias voltage is different from the first bias voltage.

In some implementations, applying the first effective erase voltage comprises applying a first bias voltage on a word line, wherein applying the effective switch erase voltage comprises applying a switch bias voltage on the word line, and wherein the switch bias voltage is different from the first bias voltage.

In some implementations, applying the first bias voltage on the word line comprises applying the first bias voltage on a dummy word line, and wherein applying the switch bias voltage on the word line comprises applying the switch bias voltage on the dummy word line.

In some implementations, the switch bias voltage on the dummy word line is higher than the first bias voltage applied on the dummy word line.

In some implementations, the first storage mode is a multi-level cell (MLC) mode, and the second storage mode is a single-level cell (SLC) mode.

In some implementations, performing the switch erase operation comprises performing the switch erase operation on a block of memory cells in a plurality of blocks included in the memory array from the first storage mode to the switched second storage mode.

In some implementations, performing the switch erase operation comprises performing the switch erase operation on a half block of memory cells in the plurality of blocks included in the memory array from the first storage mode to the switched second storage mode.

In some implementations, the first storage mode comprises four or more voltage states, the four or more voltage states corresponding to a first threshold voltage distribution; the second storage mode comprises two voltage states, the two voltage states corresponding to a second threshold voltage distribution; and a value of the switch erase voltage is configured to approach an erased state of the second threshold voltage distribution after applying the switch erase voltage to the portion of the memory array.

In some implementations, the method further comprises: performing a program operation on the portion of the memory array in the switched second storage mode; and performing the switch erase operation again on the portion of the memory array in the switched second storage mode.

In some implementations, the method further comprises performing the first erase operation on the portion of the memory array by applying a first effective erase voltage to switch from the switched second storage mode to the first storage mode.

According to another aspect of the present disclosure, a method for operating a memory device is disclosed. The method includes: selecting a portion of a memory array, wherein the portion of the memory array is programmable in a first storage mode or a second storage mode, wherein: the second storage mode has a lower storage density than the first storage mode, and the second storage mode corresponds to a second program operation; and performing a switch program operation to switch the portion of the memory array in the first storage mode to a switched second storage mode, wherein the switched second storage mode has the same storage density as the second storage mode and corresponds to the switch program operation, and wherein the switch program operation is different from the second program operation of the second storage mode.

According to another aspect of the present disclosure, a memory device is disclosed. The memory device includes: a memory array; and a peripheral circuit coupled to the memory array and configured to perform operations comprising: selecting a portion of a memory array, wherein the portion of the memory array is programmable in a first storage mode or a second storage mode, wherein: the second storage mode has a lower storage density than the first storage mode, the first storage mode corresponds to a first program operation, and the second storage mode corresponds to a second program operation; and performing a switch program operation to switch the portion of the memory array in the first storage mode to a switched second storage mode, wherein the switched second storage mode has the same storage density as the second storage mode and corresponds to the switch program operation, and wherein the switch program operation is different from the second program operation of the second storage mode.

According to another aspect of the present disclosure, one or more non-transitory computer-readable storage media is disclosed. The one or more non-transitory computer-readable storage media store instructions that when executed by one or more machines cause the one or more machines to perform operations comprising: selecting a portion of a memory array, wherein the portion of the memory array is programmable in a first storage mode or a second storage mode, wherein: the second storage mode has a lower storage density than the first storage mode, the first storage mode corresponds to a first program operation, and the second storage mode corresponds to a second program operation; and performing a switch program operation to switch the portion of the memory array in the first storage mode to a switched second storage mode, wherein the switched second storage mode has the same storage density as the second storage mode and corresponds to the switch program operation, and wherein the switch program operation is different from the second program operation of the second storage mode.

According to still another aspect of the present disclosure, a memory system is disclosed. The memory system includes: a controller; a memory device comprising a memory array; and a peripheral circuit coupled to the memory array and configured to perform operations comprising: selecting a portion of a memory array, wherein the portion of the memory array is programmable in a first storage mode or a second storage mode, wherein: the second storage mode has a lower storage density than the first storage mode, the first storage mode corresponds to a first program operation, and the second storage mode corresponds to a second program operation; and performing a switch program operation to switch the portion of the memory array in the first storage mode to a switched second storage mode, wherein the switched second storage mode has the same storage density as the second storage mode and corresponds to the switch program operation, and wherein the switch program operation is different from the second program operation of the second storage mode.

The foregoing and other described examples can each, optionally, include one or more of the following features:

In some implementations, the switch program operation is different in at least a voltage than the second program operation.

In some implementations, the second program operation uses a second program voltage, and wherein the switch program operation uses a switch program voltage that is higher than the second program voltage.

In some implementations, the first storage mode corresponds to a first program operation, the first program operation uses a first program voltage, and the switch program operation on a selected dummy word line uses a switch program voltage that is lower than the first program voltage.

In some implementations, performing the switch program operation comprises: programming a core word line to the switched second storage mode; and programming a dummy word line to a specified voltage.

In some implementations, performing the switch program operation comprises: applying a first switch program voltage to a selected core word line; and applying a second switch program voltage to a selected dummy word line, wherein the first switch program voltage applied to the selected dummy word line is lower than the second switch program voltage applied to the selected core word line.

In some implementations, performing the switch program operation comprises applying a pass voltage value on an unselected word line.

In some implementations, performing the switch program operation comprises: performing an erase operation on the portion of the memory array in the switched second storage mode; and performing the switch program operation again on the portion of the memory array The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method for operating a memory device, comprising:
    selecting a portion of a memory array, wherein the portion of the memory array is programmable in a first storage mode or a second storage mode, wherein:
        the second storage mode has a lower storage density than the first storage mode, and
        the first storage mode corresponds to a first erase operation; and
    performing a switch erase operation to switch the portion of the memory array from the first storage mode to a switched second storage mode, wherein the switched second storage mode has a same storage density as the second storage mode and corresponds to the switch erase operation, and wherein the switch erase operation is different from the first erase operation on the memory array in the first storage mode, wherein performing the switch erase operation comprises applying an effective switch erase voltage, and wherein applying the effective switch erase voltage comprises:
    applying a first switch bias voltage on a dummy word line; and
    applying a second switch bias voltage on a core word line, wherein the first switch bias voltage applied on the dummy word line is higher than the second switch bias voltage applied on the core word line.

2. The method of claim 1, wherein the switch erase operation is different in at least a voltage value than the first erase operation.

3. The method of claim 1, wherein performing the first erase operation comprises applying a first effective erase voltage, and
    wherein the effective switch erase voltage is lower than the first effective erase voltage.

4. The method of claim 3, wherein performing the switch erase operation comprises performing the switch erase operation according to a P-well erase or a gate-induce-drain-leakage (GIDL) erase.

5. The method of claim 3, wherein the first erase operation and the switch erase operation are performed according to a P-well erase operation,
    wherein applying the first effective erase voltage comprises applying a first bias voltage on a word line and applying a first erase voltage on a P-well,
    wherein applying the effective switch erase voltage further comprises applying a switch erase voltage on the P-well, and
    wherein the switch erase voltage is lower than the first erase voltage.

6. The method of claim 3, wherein the first erase operation and the switch erase operation are performed according to a gate-induce-drain-leakage (GIDL) erase operation,
    wherein applying the first effective erase voltage comprises applying a first bias voltage on a word line and applying a first erase voltage on at least one of a source line or a bit line,
    wherein applying the effective switch erase voltage comprises applying a switch bias voltage on the word line and applying a switch erase voltage on at least one of the source line or the bit line, and
    wherein the switch bias voltage is different from the first bias voltage.

7. The method of claim 4,
    wherein applying the first effective erase voltage comprises applying a first bias voltage on a word line,
    wherein applying the effective switch erase voltage comprises applying a switch bias voltage on the word line, and
    wherein the switch bias voltage is different from the first bias voltage.

8. The method of claim 7, wherein applying the first bias voltage on the word line comprises applying the first bias voltage on a dummy word line, and wherein applying the switch bias voltage on the word line comprises applying the switch bias voltage on the dummy word line.

9. The method of claim 8, wherein:
    wherein the switch bias voltage on the dummy word line is higher than the first bias voltage applied on the dummy word line.

10. The method of claim 1, wherein the first storage mode is a multi-level cell (MLC) mode, and the second storage mode is a single-level cell (SLC) mode.

11. The method of claim 1, wherein performing the switch erase operation comprises performing the switch erase operation on a block of memory cells in a plurality of blocks included in the memory array from the first storage mode to the switched second storage mode.

12. The method of claim 1, wherein performing the switch erase operation comprises performing the switch erase operation on a half block of memory cells in a plurality of blocks included in the memory array from the first storage mode to the switched second storage mode.

13. The method of claim 1, wherein:
    the first storage mode comprises four or more voltage states, the four or more voltage states corresponding to a first threshold voltage distribution;
    the second storage mode comprises two voltage states, the two voltage states corresponding to a second threshold voltage distribution; and
    a value of the switch erase voltage is configured to approach an erased state of the second threshold voltage distribution after applying the switch erase voltage to the portion of the memory array.

14. The method of claim 1, further comprising:
performing a program operation on the portion of the memory array in the switched second storage mode; and
performing the switch erase operation again on the portion of the memory array in the switched second storage mode.

15. The method of claim 1, further comprising:
performing the first erase operation on the portion of the memory array by applying a first effective erase voltage to switch from the switched second storage mode to the first storage mode.

16. A memory device, comprising:
a memory array; and
a peripheral circuit coupled to the memory array and configured to perform operations comprising:
selecting a portion of a memory array, wherein the portion of the memory array is programmable in a first storage mode or a second storage mode, wherein:
the second storage mode has a lower storage density than the first storage mode, and
the first storage mode corresponds to a first erase operation using a first effective erase voltage; and
performing a switch erase operation to switch the portion of the memory array from the first storage mode to a switched second storage mode, wherein the switched second storage mode has a same storage density as the second storage mode and corresponds to the switch erase operation, and wherein after performing the switch erase operation, a threshold voltage of a memory cell of the portion of the memory array is higher than a threshold voltage of the memory cell of the portion of the memory array after performing the first erase operation, wherein performing the switch erase operation comprises applying an effective switch erase voltage, and wherein applying the effective switch erase voltage comprises:
applying a first switch bias voltage on a dummy word line; and
applying a second switch bias voltage on a core word line, wherein the first switch bias voltage applied on the dummy word line is higher than the second switch bias voltage applied on the core word line.

17. A method for operating a memory device, comprising:
selecting a portion of a memory array, wherein the portion of the memory array is programmable in a first storage mode or a second storage mode, wherein:
the second storage mode has a lower storage density than the first storage mode, and
the second storage mode corresponds to a second program operation; and
performing a switch program operation to switch the portion of the memory array in the first storage mode to a switched second storage mode, wherein the switched second storage mode has a same storage density as the second storage mode and corresponds to the switch program operation, and wherein the switch program operation is different from the second program operation of the second storage mode, wherein performing the switch erase operation comprises applying an effective switch erase voltage, and wherein applying the effective switch erase voltage comprises:
applying a first switch bias voltage on a dummy word line; and
applying a second switch bias voltage on a core word line, wherein the first switch bias voltage applied on the dummy word line is higher than the second switch bias voltage applied on the core word line.

18. The method of claim 17, wherein the switch program operation is different in at least a voltage than the second program operation.

19. The method of claim 17, wherein performing the first erase operation comprises applying a first effective erase voltage, and wherein the effective switch erase voltage is lower than the first effective erase voltage.

20. The method of claim 17, wherein performing the switch erase operation comprises performing the switch erase operation according to a P-well erase or a gate-induce-drain-leakage (GIDL) erase.

* * * * *